(12) United States Patent
Lindblom et al.

(10) Patent No.: US 10,359,148 B2
(45) Date of Patent: Jul. 23, 2019

(54) INFLATABLE DISPLAY ACCESSORY MOUNTING SYSTEM

(71) Applicant: Skyline Displays, Inc., Eagan, MN (US)

(72) Inventors: Curtis H. Lindblom, Oakdale, MN (US); John Elliott, Eagan, MN (US); Jim Sommerville, White Bear Lake, MN (US); Nathaniel J. Nelson, Minneapolis, MN (US)

(73) Assignee: Skyline Displays, LLC, Eagan, MN (US)

( * ) Notice: Subject to any disclaimer, the term of this patent is extended or adjusted under 35 U.S.C. 154(b) by 223 days.

(21) Appl. No.: 14/975,732

(22) Filed: Dec. 19, 2015

(65) Prior Publication Data
US 2016/0109061 A1    Apr. 21, 2016

Related U.S. Application Data

(63) Continuation-in-part of application No. 14/355,442, filed as application No. PCT/US2012/062034 on Oct. 26, 2012, now Pat. No. 9,355,581, application No. 14/975,732, which is a continuation of application No. PCT/US2014/044342, filed on Jun. 26, 2014, which is a continuation-in-part of application No. PCT/US2012/062034, filed on Oct. 26, 2012.

(60) Provisional application No. 61/609,693, filed on Mar. 12, 2012, provisional application No. 61/555,347, filed on Nov. 3, 2011.

(51) Int. Cl.
G09F 15/00     (2006.01)
F16M 13/02    (2006.01)
F16M 11/04    (2006.01)
F16M 11/14    (2006.01)
F16B 1/00       (2006.01)

(52) U.S. Cl.
CPC ........ *F16M 13/022* (2013.01); *F16M 11/041* (2013.01); *F16M 11/14* (2013.01); *G09F 15/0068* (2013.01); *F16B 2001/0035* (2013.01); *F16M 2200/08* (2013.01)

(58) Field of Classification Search
USPC ............ 248/220.21, 220.22, 222.11, 222.13, 248/223.41; 446/223
See application file for complete search history.

(56) References Cited

U.S. PATENT DOCUMENTS

| | | | |
|---|---|---|---|
| 6,240,666 B1 * | 6/2001 | Apel | G09F 15/0025 40/602 |
| 7,181,877 B2 | 2/2007 | Quade | |
| 7,540,456 B2 * | 6/2009 | Thompson | A47G 1/175 211/105.1 |
| 7,588,222 B1 * | 9/2009 | Feldberg | F21V 21/116 248/218.4 |

(Continued)

*Primary Examiner* — Joanne Silbermann
(74) *Attorney, Agent, or Firm* — Thomas J. Oppold; Craig J. Lervick; Larkin Hoffman Daly & Lindgren, Ltd.

(57) ABSTRACT

An accessory mounting system for an inflatable display. The accessory mounting system includes a cuff selectively positionable onto the inflatable airframe members of the inflatable display. The cuff remains on the airframe member when the inflatable display is in a deflated state. The cuff includes a mounting mechanism to which an accessory connector removably attaches over the exterior cover of the inflatable display. The accessory connector is adapted to support the accessory.

37 Claims, 20 Drawing Sheets

(56) References Cited

U.S. PATENT DOCUMENTS

| | | | | |
|---|---|---|---|---|
| 7,766,291 B2 * | 8/2010 | Eilmus | ...................... | E03C 1/06 |
| | | | | 248/222.11 |
| 7,771,131 B2 * | 8/2010 | Scott | ...................... | F16M 11/10 |
| | | | | 248/176.3 |
| 7,922,136 B2 * | 4/2011 | Lien | ........................ | B62J 11/00 |
| | | | | 224/420 |
| 8,084,115 B2 * | 12/2011 | Lanzi | ........................ | B44C 5/00 |
| | | | | 428/40.1 |
| 9,125,467 B2 * | 9/2015 | Randel | ................... | A45C 11/26 |

* cited by examiner

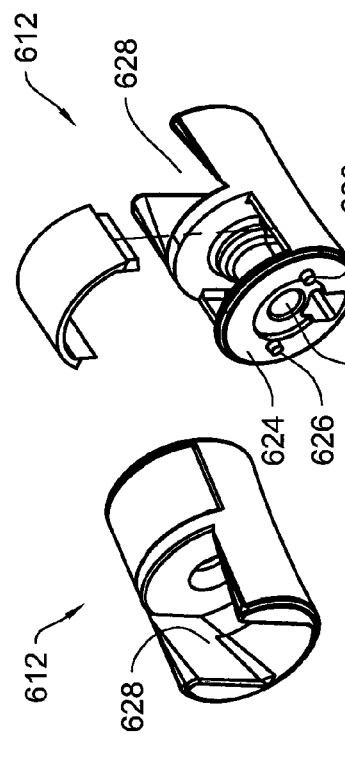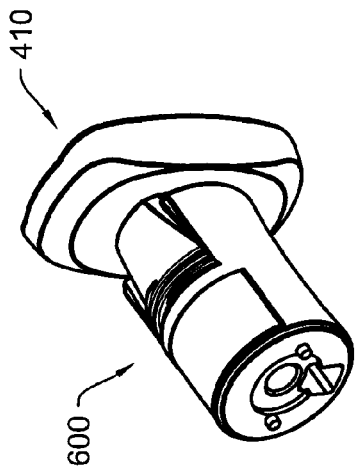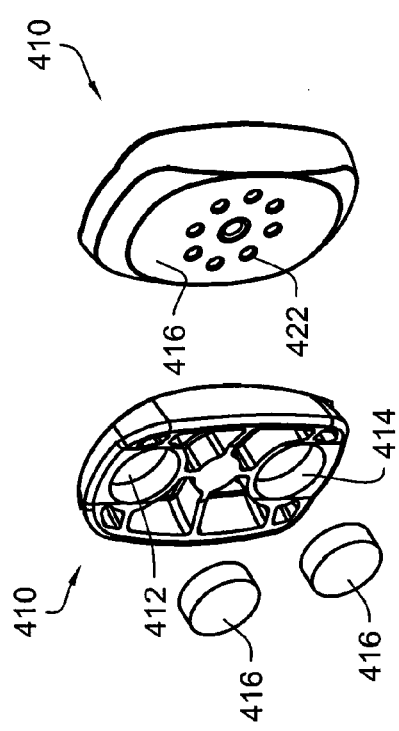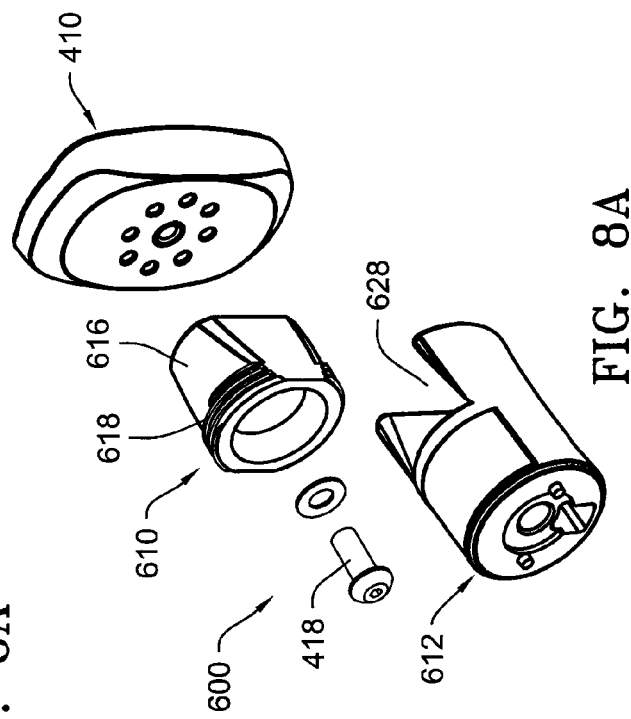

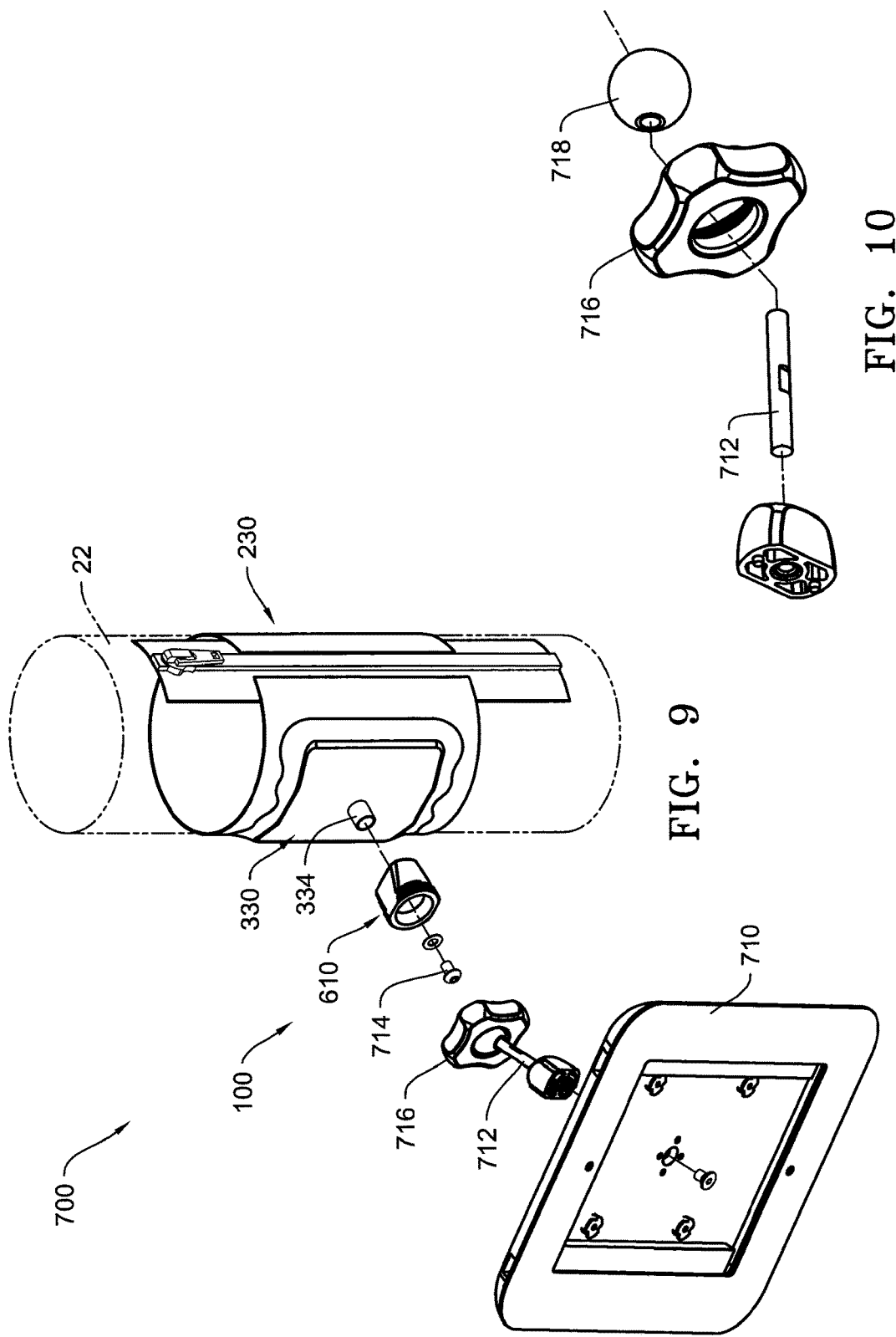

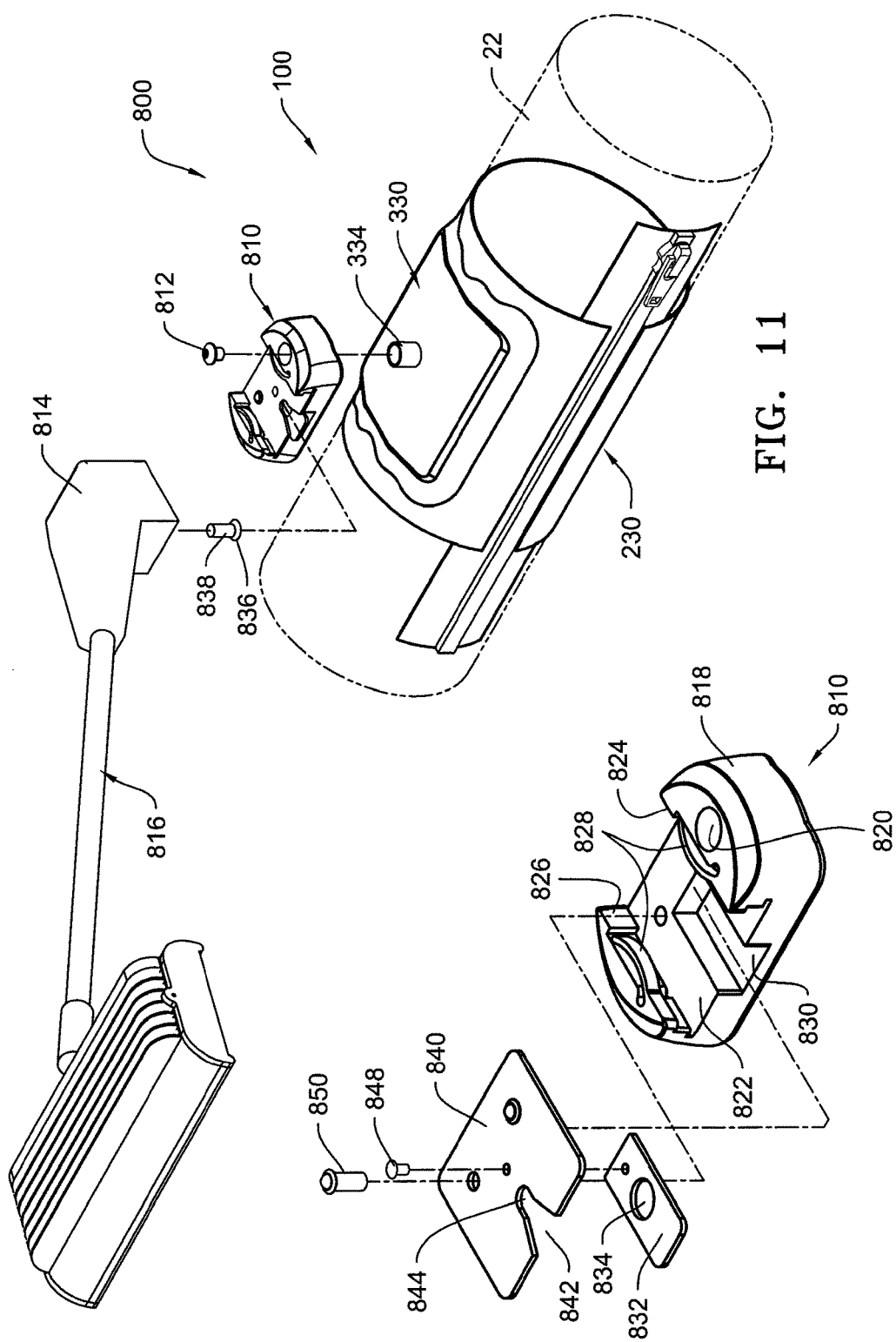

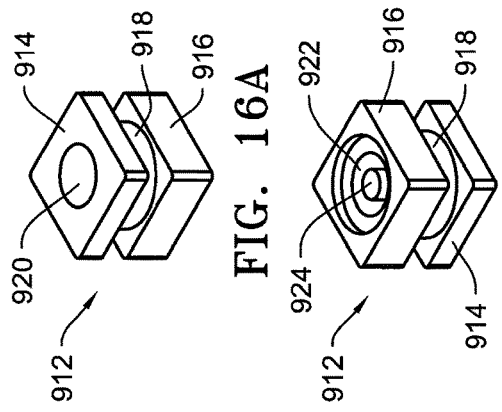
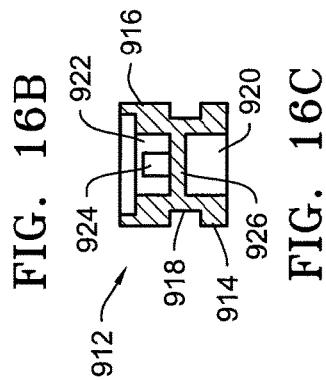
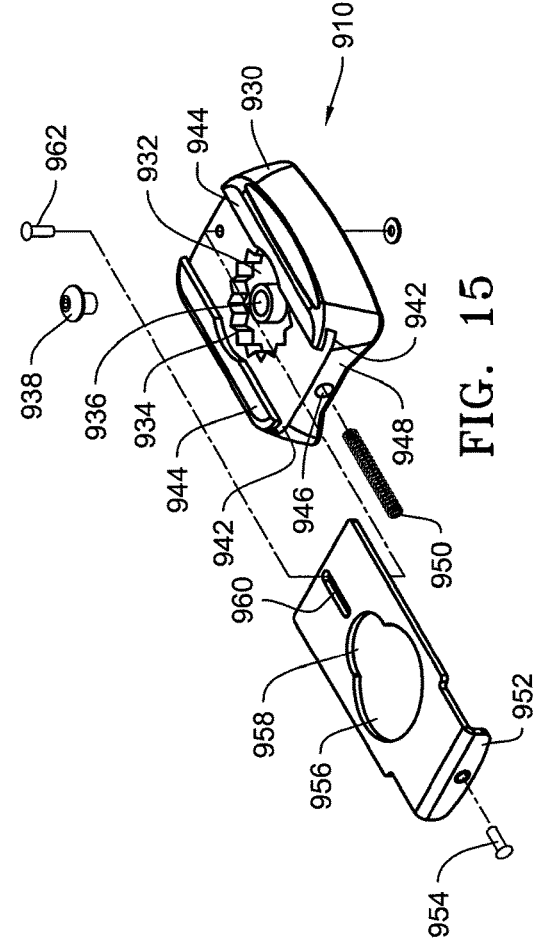
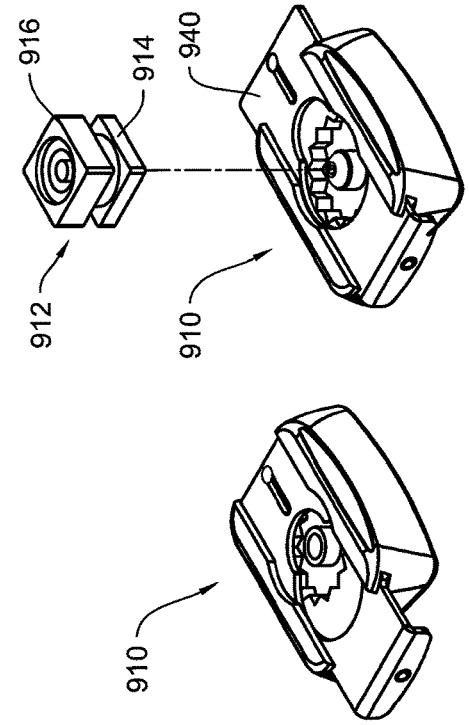

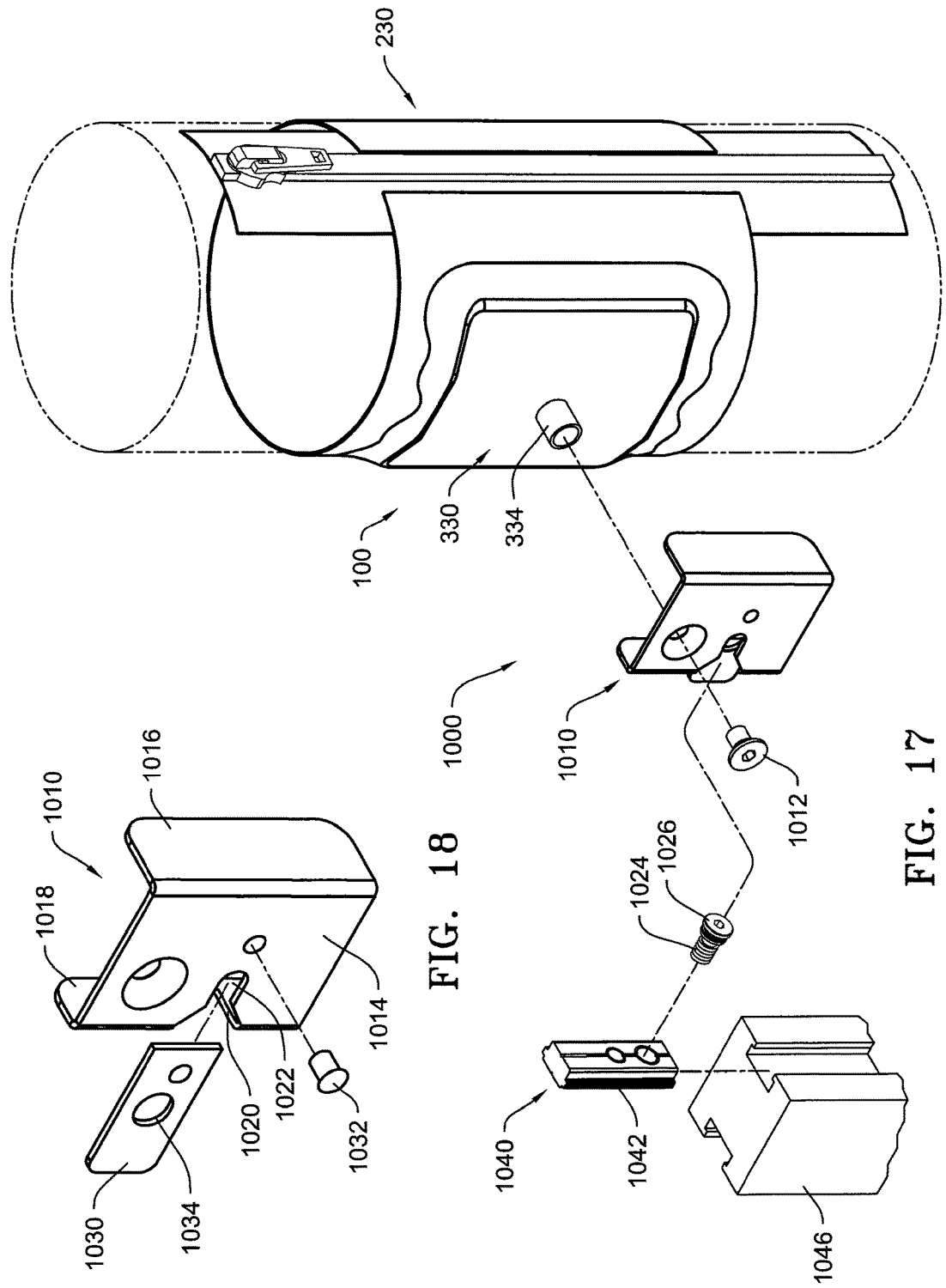

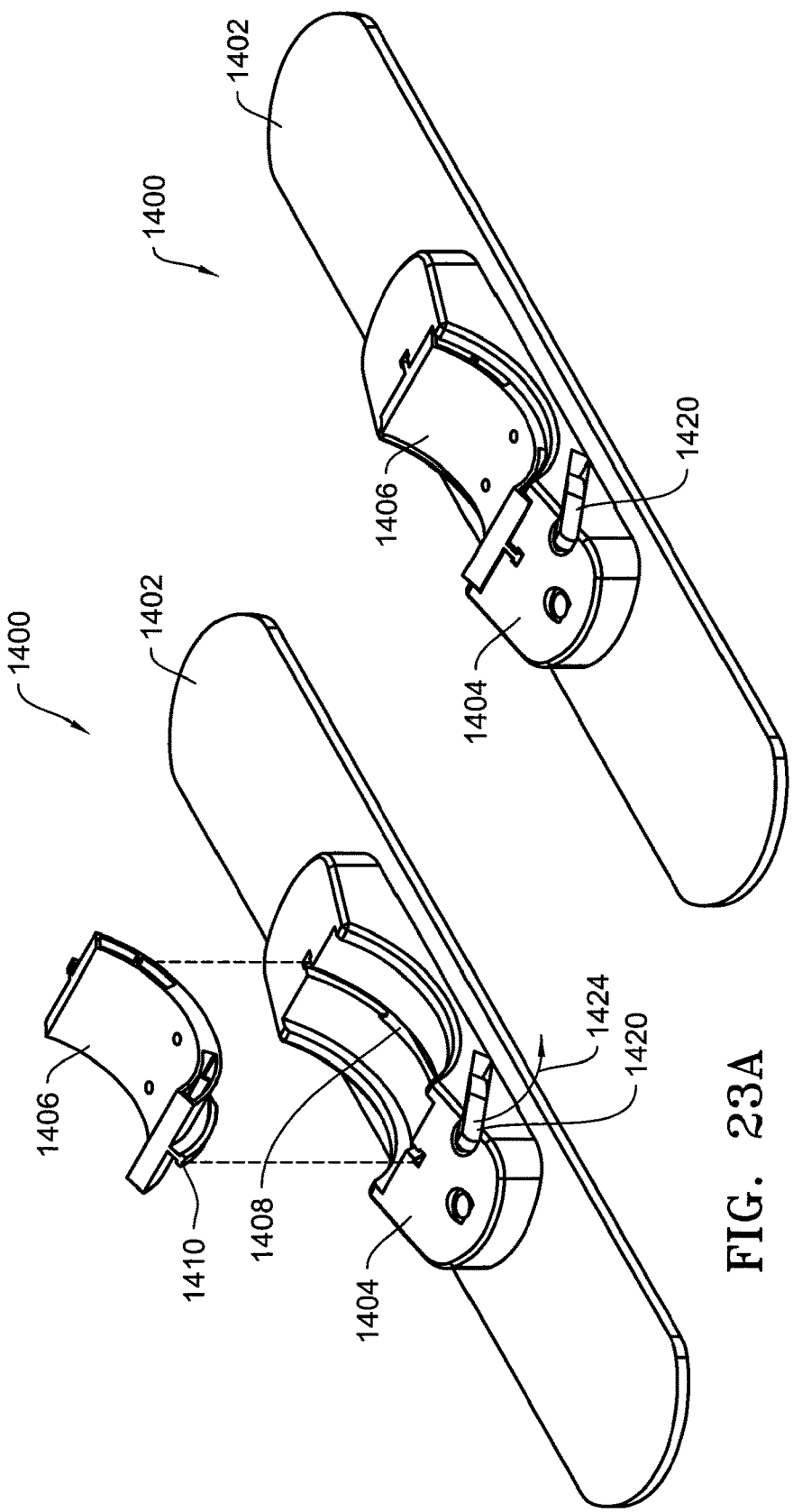

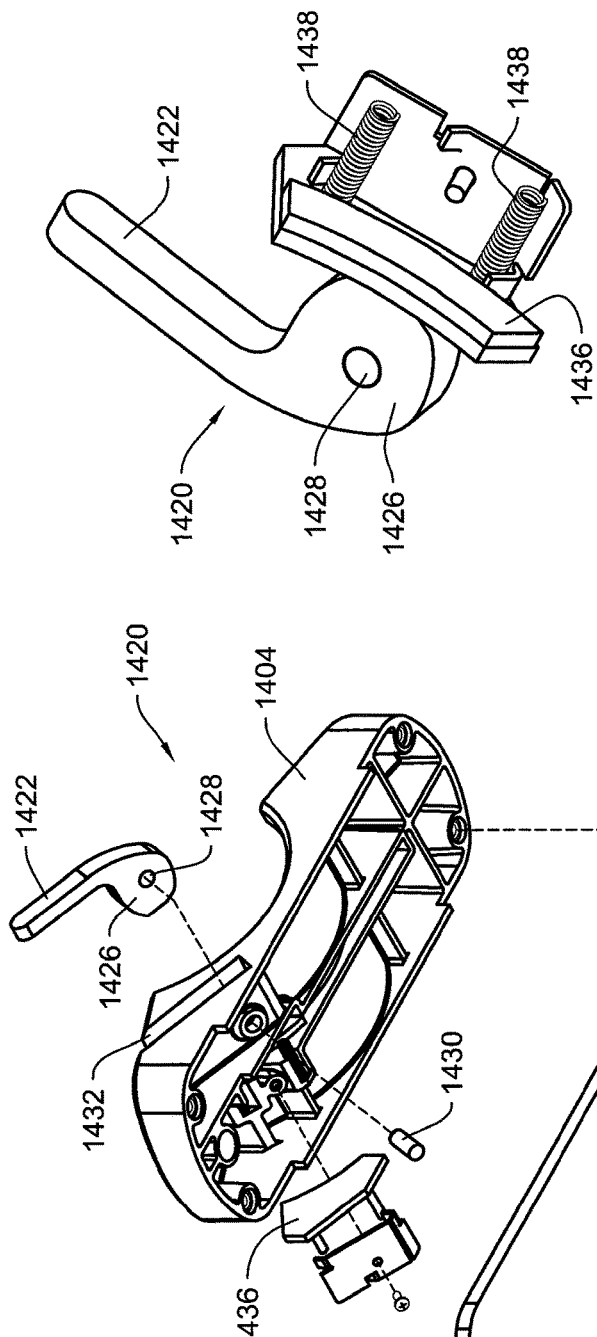
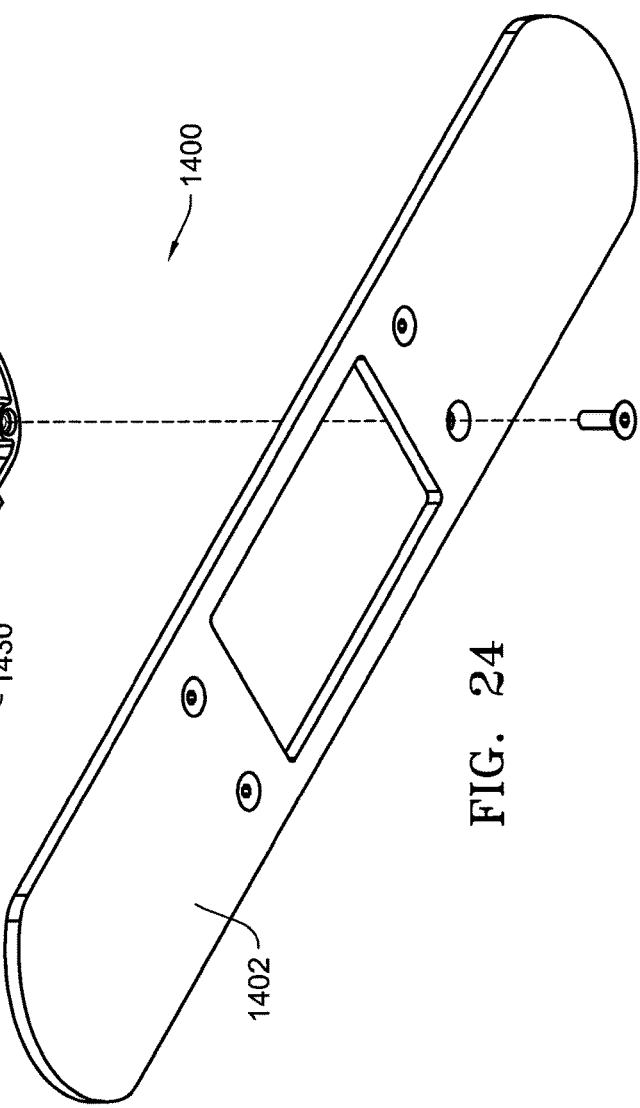
FIG. 24
FIG. 25

INFLATABLE DISPLAY ACCESSORY MOUNTING SYSTEM

CROSS-REFERENCE TO RELATED APPLICATIONS

This application is a continuation-in-part of U.S. application Ser. No. 14/355,442, filed Apr. 30, 2014 which is a national stage entry of International Application No. PCT/US2012/062,034 filed Oct. 26, 2012 which claims the benefit of U.S. Provisional Application No. 61/609,693, filed Mar. 12, 2012 and U.S. Provisional Application No. 61/555,347, filed Nov. 3, 2011. This application is also a continuation of International Application No. PCT/US2014/044,342, filed Jun. 26, 2014 which is a continuation-in-part of International Application No. PCT/US2012/062,034 filed Oct. 26, 2012 which claims the benefit of U.S. Provisional Application No. 61/609,693, filed Mar. 12, 2012 and U.S. Provisional Application No. 61/555,347, filed Nov. 3, 2011.

BACKGROUND

Inflatable display systems used by exhibitors at tradeshows offer several advantages over traditional or conventional rigid frame displays with respect to ease and speed of setup, takedown and portability. However, unlike rigid frame displays, inflatable displays are not as readily adaptable for supporting accessories, such as lamps or lights, audio visual components, overlays, other inflatable displays, or other rigid frame members.

Accordingly, there is a need for an effective system and method for mounting or attaching accessories to inflatable displays.

BRIEF DESCRIPTION OF THE DRAWINGS

FIGS. 6A and 6B are rear and front perspective views of a magnet connector FIGS. 7A and 7B are front and rear perspective views of the female standoff.

FIG. 8A is an exploded perspective view showing the male standoff and magnet connector and female standoff.

FIG. 8B is a perspective view of the mated male and female standoff and magnet connector.

FIG. 9 is an enlarged exploded perspective view of an embodiment of an AV mount system identified by the circled area so designated in FIG. 2.

FIG. 10 is an exploded perspective view of an embodiment of an AV mount ball joint shown in FIG. 9.

FIG. 11 is an enlarged exploded perspective view of a light mount system identified by the circled area so designated in FIG. 2.

FIG. 12 is an enlarged exploded perspective view of the light mount connector of FIG. 11.

FIGS. 14A-14B are perspective views of an embodiment of a mounting clip of FIG. 13 showing the clip plate in the normally closed and open positions.

FIG. 14C is a perspective views of an embodiment of a mounting clip of FIGS. 14A-14B showing the stud connector received in the mounting clip.

FIG. 15 is an exploded perspective view of the mounting clip of FIGS. 14A-14B.

FIG. 16A-16B are front and rear perspective views of the connector stud of FIG. 13.

FIG. 16C is a cross-sectional view of the connector stud of FIGS. 16A-16B.

FIG. 17 is an exploded perspective view of an embodiment of a rigid member mounting system for attaching rigid channel members.

FIG. 18 is an enlarged exploded perspective view of the mounting bracket of FIG. 17.

FIGS. 23A and 23B are a top perspective view of an embodiment of a foot assembly showing a saddle plate embodiment being received in the saddle block.

FIG. 24 is an exploded bottom perspective view of the foot assembly of FIG. 24A.

FIG. 25 is an enlarged perspective view of the saddle brake of the foot assembly.

DESCRIPTION

Figure 1:
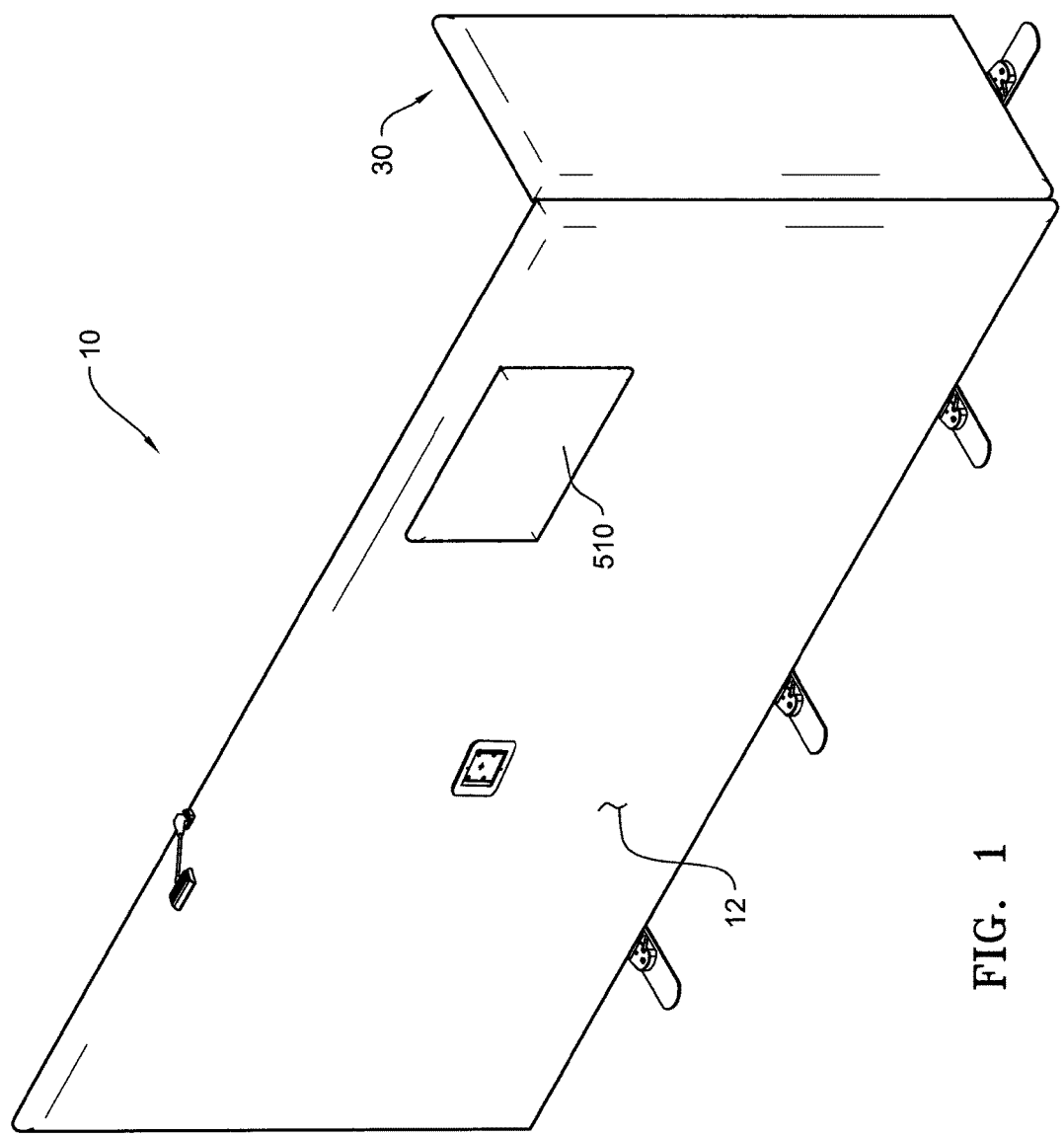
FIG. 1 is a perspective view of an embodiment of an inflatable airframe display having various accessories mounted thereto.

Referring to the drawings, wherein like reference numerals identify the same or corresponding parts throughout the several views, FIG. 1 is a perspective view of an inflatable airframe display 10 as disclosed in Applicant's co-pending published application WO2013/066738, which is incorporated herein, in its entirety, by reference.

Figure 2:
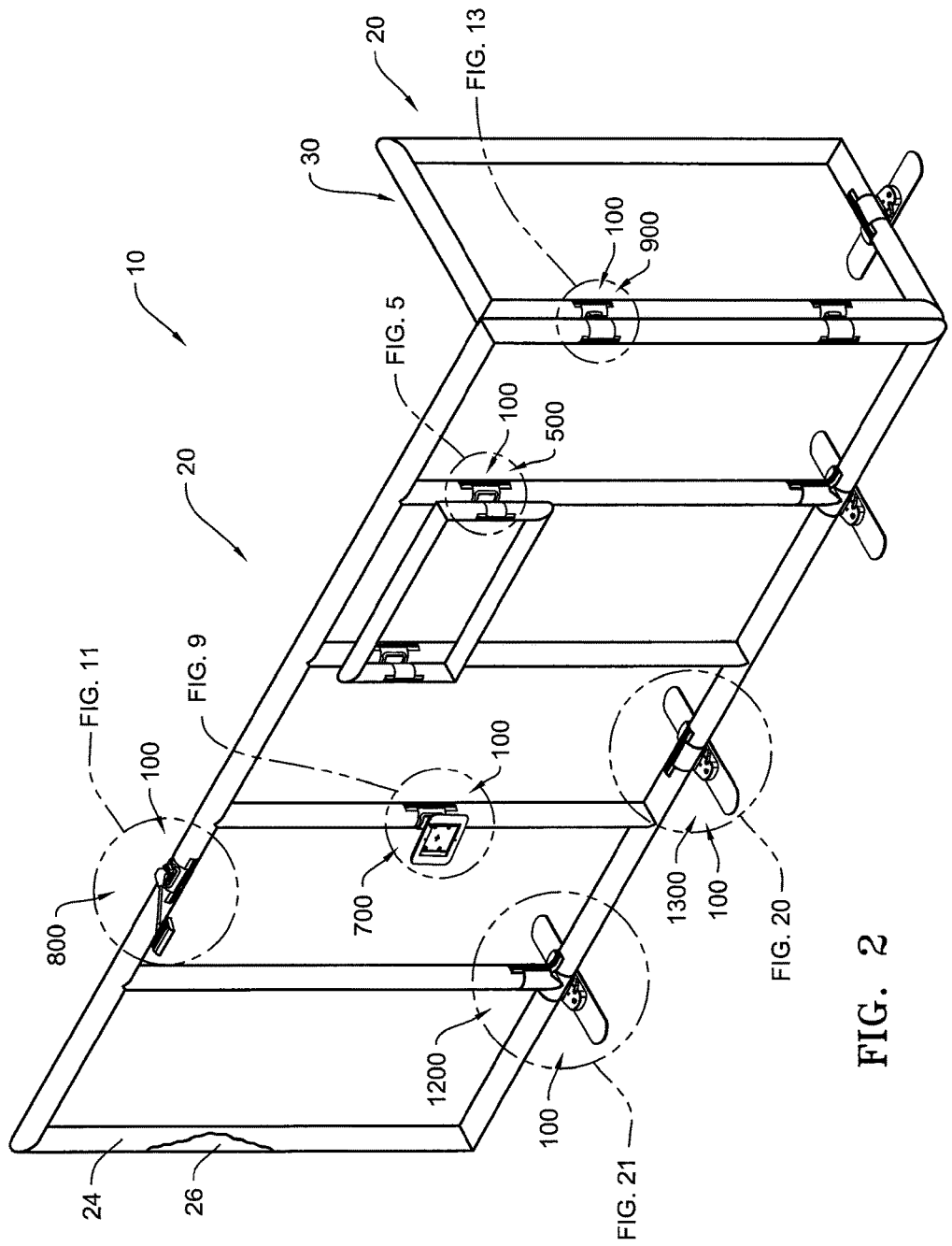
FIG. 2 is a perspective view of the inflatable airframe display of FIG. 1 with the cover removed to show the airframe and accessory mounting systems.

The display 10 includes a stretch fabric a cover 12 which is received over an airframe 20 (FIG. 2). The airframe 20 includes a plurality of tubular airframe members 22. The airframe members 22 are comprised of a sleeve 24 of dimensionally stable material and an air tight bladder 26. The air tight bladder 26 may be a separate, sealed tube removable from the sleeve 24 or the bladder may be integral with the sleeve by coating the interior or exterior of the sleeve material to make it air tight. One or more air ports (not shown) is/are provided to inflate the airframe 20.

Tubular jumpers (not shown) may be provided to fluidly connect the air tight bladders of the airframe members 22.

As illustrated in FIG. 2, an accessory mounting system 100 is used for mounting various accessories to the airframe 20, the accessories may include a foot assembly, a lamp, an audio-visual support platform, an overlay, a second inflatable airframe display 30, or various rigid members (i.e., (non-inflatable members) such as posts, beams, trusses, table or support stand members, etc.

Generally, the accessory mounting system 100 includes a cuff 200 which includes mounting mechanism 300. The mounting system 100 further includes an accessory connector which removably attaches over the exterior cover 12 of the inflatable display 10 to the mounting mechanism 300. The accessory connector is adapted to support an accessory as previously identified.

Various embodiments of the cuff 200 are illustrated in FIGS. 3-4 and 20-21. The cuff 200 is selectively positionable onto an airframe member 22 and is sized to frictionally engage the airframe member 22 when the inflatable display 10 is in an inflated state. The cuff 200 remains on the airframe 20 when the inflatable display is in a deflated state.

Figure 3:
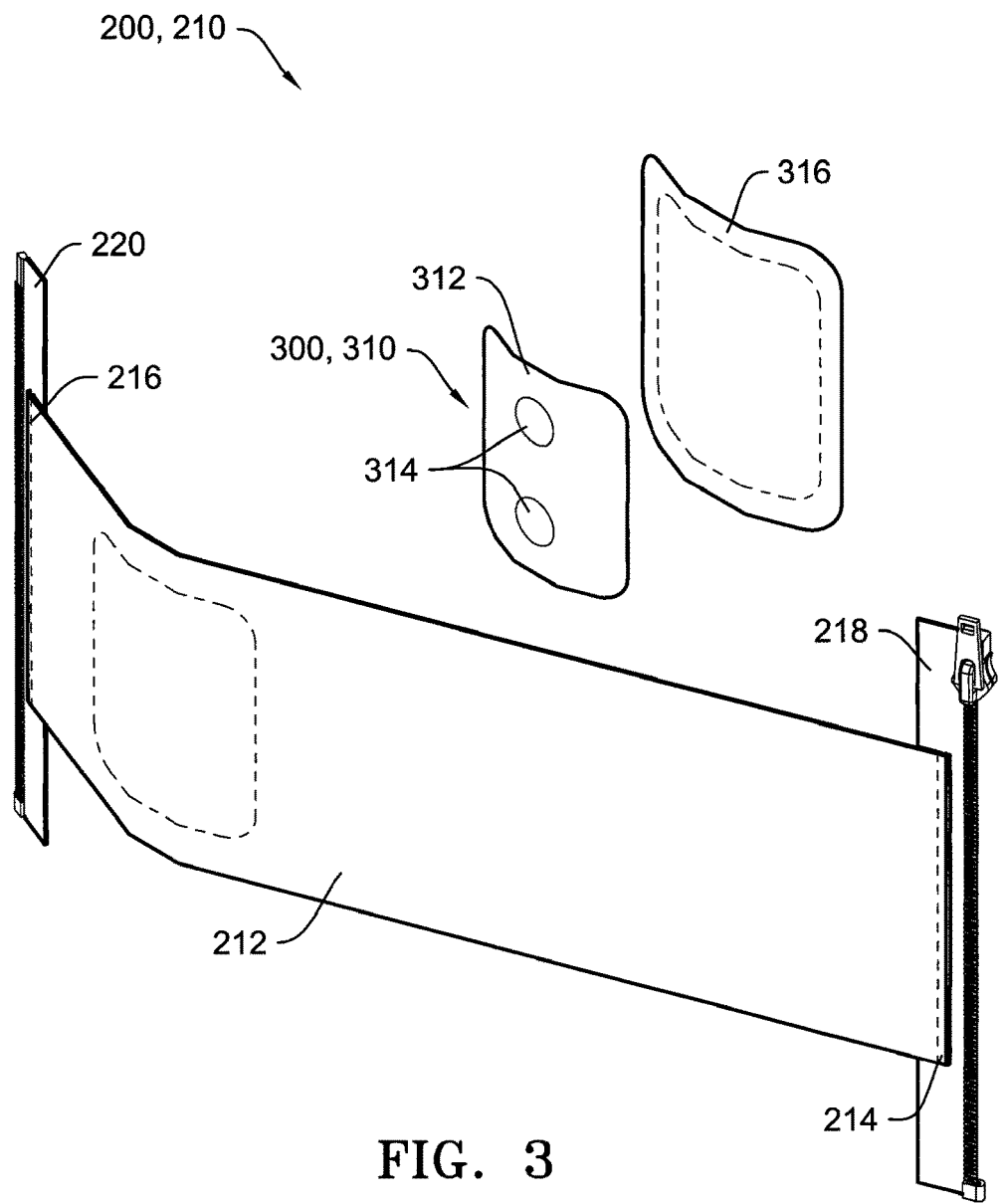
FIG. 3 is an exploded view of a magnet cuff.

FIG. 3 illustrates an embodiment of a cuff 200 with a mounting mechanism 300 that is magnetic (hereinafter a "magnetic mount" 310). A cuff 200 having a magnetic mount 310 is hereinafter referred to as a magnetic cuff 210. The magnetic cuff 210 comprises a cuff body 212 having first and second ends 214, 216 which are removable attach to one another, such as by a zipper, or by any other suitable attachment means, including, without limitation, hook-and-loop fasteners, snaps, lacing, clasps, etc. As shown in FIG. 3, mating sides of a zipper 218, 220 are stitched to the respective first and second ends of the cuff body. The cuff body 212 may be made of the same material as the sleeve 24 of the airframe members 22. The cuff body 212 is sized so that when the ends 214, 216 are attached the cuff frictionally engages the airframe member 22 when the display is fully inflated so that the cuff 210 does not slide with respect to the airframe member 22. The cuff 210 may also be secured to the sleeve 24 of the airframe member such as by a plastic pop rivet, stitching or other suitable attaching means to retain the cuff in the desired position with respect to the airframe member 22 so that the cuff 210 does not move when the display is deflated, thereby avoiding the need to reposition the cuff 210 each time display is used. If a different configuration for mounting accessories is desired, because the cuff 210 is preferably not permanently affixed to the airframe member 22, the cuff 210 may be removed and repositioned onto other airframe members 22 as desired.

The magnetic mount 310 includes a rigid cuff plate 312 having one or more magnets 314 secured thereto. The rigid cuff plate 312 may be made of any suitably rigid material, that is preferably light weight. It is preferably, that the cuff plate 312 is non-magnetic such that when attaching the magnetic accessory connector 410 (discussed later) to the magnetic mount 310 of the magnetic cuff 210, the magnets 314 assist in self aligning the magnetic accessory connector 410 to the magnetic mount 310. A patch 316 may be provided on the back side of the cuff plate 312 to protect the sleeve 24 from abrasion and wear. The patch 316 may be made of any suitable, and preferably non-abrasive material, and may be adhered by an adhesive or by stitching (as designated by dashed lines) to retain the cuff plate 312 in position.

Figure 4:
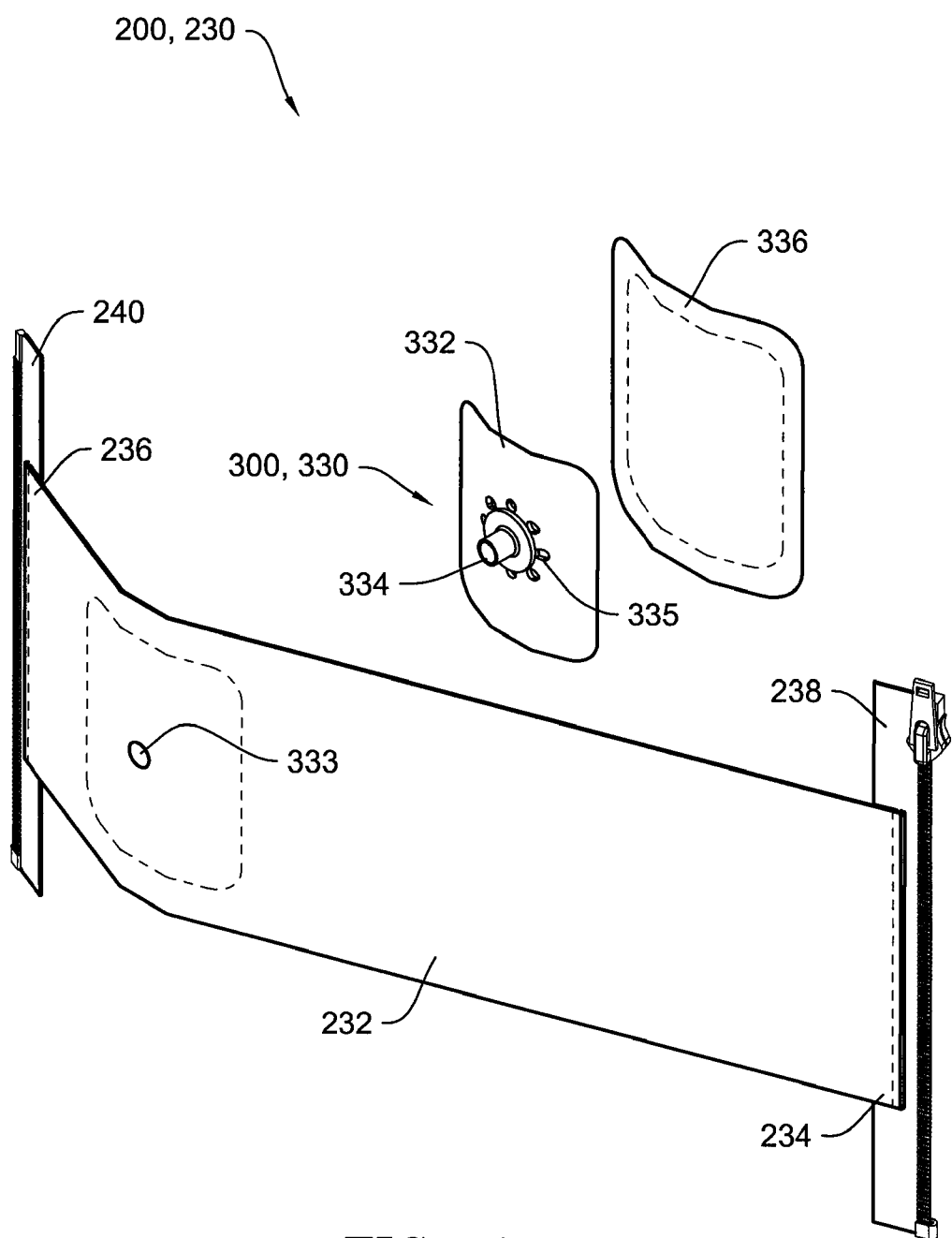
FIG. 4 is an exploded view of a stud cuff.

FIG. 4 illustrates an embodiment of a cuff 200 with a mounting mechanism comprising an internally threaded stud (hereinafter a "stud mount" 330). A cuff 200 having a stud mount 330 is hereinafter referred to as a stud cuff 230. The stud cuff 230 comprises a cuff body 232 having first and second ends 234, 236 which are removable attach to one another, such as by a zipper, or by any other suitable attachment means, including, without limitation, hook-and-loop fasteners, snaps, lacing, clasps, etc. As shown in FIG. 4, mating sides of a zipper 238, 240 are stitched to the respective first and second ends of the cuff body. The cuff body 232 may be made of the same material as the sleeve 24 of the airframe members 22. The cuff body 232 is sized so that when the ends 234, 236 are attached the cuff frictionally engages the airframe member 22 when the display is fully inflated so that the cuff 230 does not slide with respect to the airframe member 22. The cuff 230 may also be secured to the sleeve 24 of the airframe member such as by a plastic pop rivet, stitching or other suitable attaching means to retain the cuff in the desired position with respect to the airframe member 22 so that the cuff 230 does not move when the display is deflated, thereby avoiding the need to reposition the cuff 230 each time display is used. If a different configuration for mounting accessories is desired, because the cuff 230 is preferably not permanently affixed to the airframe member 22, the cuff 230 may be removed and repositioned onto other airframe members 22 as desired.

The stud mount 330 includes a rigid cuff plate 332 having an internally threaded stud 334 secured thereto. An internally threaded stud is preferred because the stud 334 projects through a small opening 333 in the exterior cover 12, so if the stud 334 was externally threaded there is a greater chance that the stud 334 may snag, tear or otherwise damage the exterior cover when the display is being deflated or when the deflated display is being folded and compressed for storage. The rigid cuff plate 332 may be made of any suitably rigid material, that is also preferably light weight. The rigid cuff plate 332 includes a plurality of spaced depressions or apertures 335 around the threaded stud 334 (the purpose of the depressions 335 will be discussed later). The stud mount 330 threadably connects to a threaded accessory connector by a threaded fastener as discussed below. A patch 336 may be provided on the back side of the cuff plate 332 to protect the sleeve 24 from abrasion and wear. The patch 336 may be made of any suitable, and preferably non-abrasive material, and may be adhered by an adhesive or by stitching (as designated by dashed lines) to retain the cuff plate 332 in position.

Figure 5:
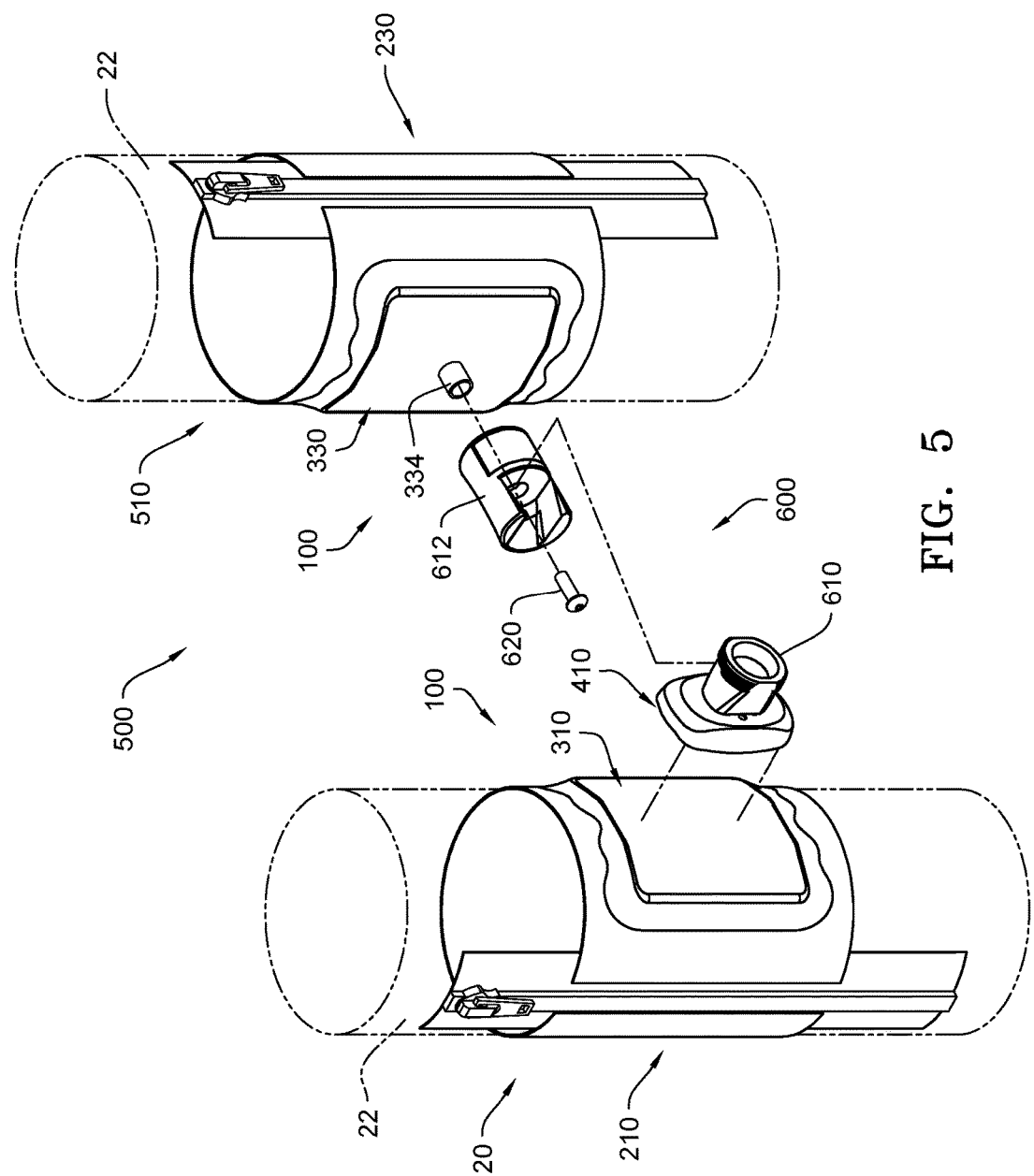
FIG. 5 is an enlarged exploded perspective view of an embodiment of the overlay mounting system identified by the circled area so designated in FIG. 2.

FIG. 5 is an enlarged exploded perspective view of the circled area of FIG. 2 so designated showing an embodiment of an accessory mounting system 100 for mounting an overlay 510 to the inflatable display (hereinafter an overlay mounting system 500). The overlay 510 is depicted as an inflatable overlay, but it should be appreciated that the overlay 510 may be any accessory that "overlays" the display surface of the inflatable display 10.

The overlay mounting system 500 includes a magnetic cuff 210 mounted to an airframe member 22 of the airframe 20 and a stud cuff 230 is mounted to an airframe member 22 of the overlay 510. The overlay mounting system 500 further includes a standoff 600 to position the overlay 510 away from the display surface of the inflatable display 10. The standoff 600 includes a male standoff 610 and a female standoff 612. The male standoff 610 is threadably attached to the face of the magnetic accessory connector 410. The magnetic accessory connector 410 magnetically mounts to the magnetic mount 310 of the magnetic cuff 210. The female standoff 612 threadably mounts to the stud mount 330 by a threaded fastener 620.

An embodiment of the magnetic accessory connector 410 is illustrated in FIGS. 6A-6B. The back side of the magnetic accessory connector 410 (FIG. 6A) includes two recesses 412, 414 for receiving magnets 416. The magnets 416 are positioned in the back side of the magnetic accessory connector 410 to matably align with the magnets 314 positioned in the cuff plate 312 of the magnetic mount 310 of the magnetic cuff 210.

The male standoff 610 threadably attaches to the face 416 of the magnetic accessory connector 410 by a threaded fastener 418 extending through an aperture (not shown) in the back wall of the male standoff 610 and is threadably received by an internally threaded aperture 420 in the face 416 of the magnetic accessory connector 410. The forward end of the male standoff 610 includes a dovetail shaped socket 616 having external threads 618 (the purpose of which will be discussed later). Pegs (not shown) project from the back wall of the male standoff 610 and are received by mating depressions 422 in the face 416 of the magnetic accessory connector 410. The pegs seat within the mating depressions 422 preventing the male standoff 610 from rotating with respect to the magnetic accessory connector 410.

Referring to FIGS. 5, 7A-7B and 8A-8B. The female standoff 612 threadably attaches to the stud mount 330 by a threaded fastener 620 extending through an aperture 622 in the base 624 of the female standoff 612 and is threadably received by the internally threaded stud 334 of the stud mount 330. Pegs 626 project from the back of the base 624. The pegs 626 are received by the aligned depressions 335 (FIG. 4) in the cuff plate 312. The pegs 626 seat within the mating depressions 335 preventing the female standoff 614 from rotating. It should be appreciated that the stud cuff body 232 extends over the depressions 335, but as the threaded fastener 620 is tightened, the pegs 626 deform the stud cuff body 232 and seat within the mating depressions 335. The female standoff 612 includes a slot 628 sized and configured to receive the male standoff 610. It should be appreciated that the slot 628 is dovetailed to receive the male dovetailed standoff 610. The mating dovetails prevent the male standoff 610 from sliding out of the female slot 628 in the axial direction. Thus, to remove the male standoff 610 from the slot 628, the male standoff 610 must be moved transversely with respect to the axis of the female standoff 612. Prior to or after deflating the display 10, the magnetic accessory connector 410 (with the male standoff attached) may be detached from the magnetic cuff 210. The female standoff 612 may remain attached to the stud cuff 230.

FIG. 9 is an enlarged exploded perspective view of the area circled in FIG. 2 so designated showing another accessory mounting system for mounting an AV component to the inflatable display 10 (hereinafter an AV mounting system 700). The AV mounting system 700 includes an AV support 710 attached to a ball joint arm 712. An exploded perspective view of the ball joint arm 712 is illustrated in FIG. 10. The AV component supported by the AV platform 710, may be a monitor, portable computer, tablet, or other AV component. The AV mounting system 700 includes a stud cuff 230 mounted to an airframe member 22 and a male standoff 612 which is threadably attached by an externally threaded fastener 714 received within the internally threaded stud 334 of the stud mount 330. The ball joint arm 712 includes a nut 716 which retains the ball joint 718. The nut 716 threads over the external threads 618 of the male standoff 610 thereby retaining and supporting the ball joint 718 within the socket 616 of the male standoff 610. As previously discussed, the pegs (not shown) projecting from the back wall of the male offset 610 are received by the aligned depressions 335 (FIG. 4) in the cuff plate 312. As the threaded fastener 714 is tightened, the pegs deform the stud cuff body 232 and seat within the mating depressions 335 preventing the male standoff 610 from rotating. Prior to or after deflating the display 10, the AV platform 710 and ball joint arm 712 may be removed from the male standoff 610 by unthreading the nut 716. The male standoff 610 may remain attached to the stud cuff 230.

FIG. 11 is an enlarged exploded perspective view of the circled area of FIG. 2 so designated, showing another accessory mounting system 100 for mounting a lamp to the inflatable display (hereinafter a lamp mounting system 800). The lamp mounting system 800 includes a stud cuff 230 mounted to an airframe member 22. In this embodiment, the accessory connector includes a lamp bracket 810 which is threadably attached by an externally threaded fastener 812 received within the internally threaded stud 334 of the stud mount 330. The lamp bracket 810 is sized to receive and rigidly retain the lamp base 814 of lamp 816. An enlarged exploded perspective view of the lamp bracket 810 is shown in FIG. 12. The lamp bracket 810 includes a base 818 having an aperture 820 for receiving the threaded fastener 812 for threadably mounting the lamp bracket 810 to the threaded stud 334 of the stud mount 330 of stud cuff 230. The base 818 of the lamp bracket 810 includes a recessed portion 822 between end walls 824, 826. The endwalls 824, 826 include a resilient arched members 828. The recess portion 822 includes a cutout 830 which is covered by a spring plate 832 having an aperture 834. The aperture 834 is slightly larger than the flanged head 836 of the peg 838 (FIG. 11) which projects from the bottom side of the base 814 of the lamp 816. A top plate 840 is positioned over the spring plate 832. The top plate 840 includes a flared notch 842 intersecting an aperture 844 sized to receive the shaft 846 of the peg 838 but less than the diameter of the flanged head 836 of the peg 838. The top plate 840 and spring plate 832 are secured to the base 818 by a rivet 848 and pins 850.

To attach the lamp 816 to the lamp bracket 810, the lamp base 814 is positioned between the end walls 824, 826 and pushed toward the lamp bracket 810. The resilient arched members 828 provide frictional resistance against the lamp base 814 to help ensure a tight fit to minimize play of the lamp base 814 within the bracket 810. The peg 838 projecting from the bottom side of the lamp base 814 is directed toward the notch 842 in the top plate 840. The spring plate 832 is depressed into the cutout 830 to permit the flanged head 836 of the peg 838 to be received between the spring plate 832 and the top plate 840, until the flanged head 836 is received within the aperture 834 of the spring plate 832, thereby mechanically restraining the peg 838 within the flared notch 842 of the top plate 840. To release the lamp base 814 from the lamp bracket 810, the spring plate 832 is depressed into the cutout 830 to permit the flanged head 836 of the peg 838 to pass through the aperture 834 and allowing the lamp base 814 to be moved in the direction away from the lamp bracket 810 until it is free.

Figure 13:
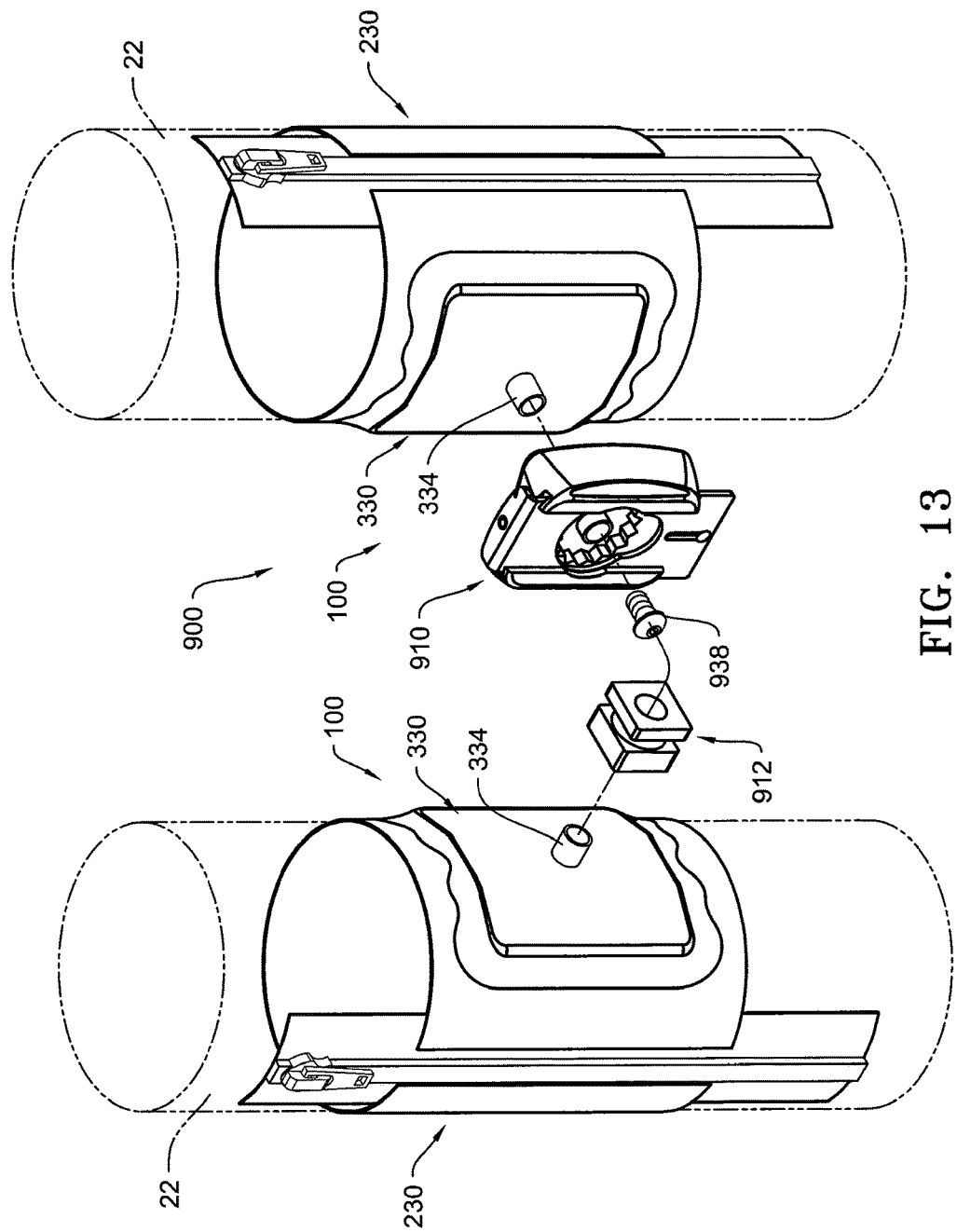
FIG. 13 is an enlarged exploded perspective view of the display-to-display mounting system identified by the circled area so designated in FIG. 2.

FIG. 13 is an enlarged exploded perspective view of the corresponding circled area of FIG. 2, so designated, showing an accessory mounting system 100 for attaching a second inflatable display 50 to the first inflatable display 10 (hereinafter a display-to-display mounting system 900). The display-to-display mounting system 900 includes a stud cuff 230 mounted to an airframe member 22 of the first inflatable display 10 and a second stud cuff 230 mounted to an airframe member 22 of the second inflatable display 30. The display-to-display attaching system 900 further includes a mounting clip 910 which is threadably attached to one of the stud cuffs 230 and a connector stud 912 which is threadably attached to the other stud cuff 230 and is releasably yet firmly held by the mounting clip 910 thereby attaching the first and second displays 10, 50 together as hereinafter described.

Referring to FIGS. 14A-14C a perspective view of an embodiment of a mounting clip 910 is shown receiving the connector stud 912. FIG. 15 is an exploded perspective view of the mounting clip 910. FIGS. 16A-16C are top and bottom perspective views and a cross-sectional view, respectively of the connector stud 912.

Referring to FIGS. 16A-16C, the connector stud 912 includes a square flanged first end 914 and a square second end 916 spaced apart by cylindrical shaft 918. The square first end 914 includes a first central bore 920. The square second end 916 also includes a second central bore 922 a threaded pin 924 extends into the second central bore 922 from an internal wall 926 between the first and second central bores 920, 922, such that the second end is received over the threaded stud 334 and the threaded pin 924 is threadably received into the threaded stud 334 of the stud mount 330 of one of the stud cuffs 230 (see FIG. 13).

The mounting clip 910 includes a base 930 with a central recess 932 with inwardly extending points 934 about its periphery for receiving square flanged first end 914 of the connector stud 912, wherein the inwardly extending teeth grip the corners of the square flanged first end 914 of the connector stud 912 to prevent the of the connector stud 912 from rotating within the recess 932 (similar to a box wrench). The number of inwardly extending points 934 may vary but the more points provided will allow the more angles by which the square flanged first end 914 of the connector stud 912 is receivable within the recess 932. A central aperture 936 is provided through the base 930. A threaded fastener 938 extends through the central aperture and is threadably received by the internally threaded stud 334 of the stud mount 330 of the other stud cuff 230 to secure the mounting clip 910 thereto. A clip plate 940 is received within slots 942 formed by top inwardly projecting flanges 944 of the base 930. A bore 946 extends into an end 948 of the base 932. The bore 946 partially receives a coil spring 950. A free end of the coil spring 950 projects outwardly from the bore 946 and abuts a downwardly projecting lip 952 of the clip plate 940. A pin 954 extends through the downwardly projecting lip 952 and restrains the free end of the coil spring 950 from lateral movement. The clip plate 940 includes a large diameter opening 956 and an intersecting smaller diameter opening 958. The larger diameter opening 956 is sufficiently sized to permit the square flanged first end 914 of the connector stud 912 to pass through. The intersecting smaller diameter opening 958 is sized to receive the cylindrical shaft 918 of the connector stud 912. The clip plate 940 also includes an elongated slot 960 through which extends a rivet 962 thereby slidably retaining the clip plate 940 to the base 930. It should be appreciated that the coil spring 950 biases the clip plate 940 outwardly with respect to the base 930 to a normally closed position such that the smaller diameter opening 958 is positioned at least partially over the recess 932 (see FIG. 14A).

To attach the mounting clip 910 which is threadably fastened to one of the stud cuffs 230 to the connector stud 912 with is threadably fastened to the other stud cuff 230, the clip plate 940 is pressed toward the base 930 exposing the central recess 932 with inwardly extending points 934 (see FIG. 14B). The square flanged first end 914 of the connector stud 912 is then positioned into the central recess between the inwardly extending points 934. The clip plate 940 is then released allowing the clip plate to spring back to its normally closed position restraining the square flanged first end 914 of the connector stud 912 therein (see FIG. 14C).

Figure 19:
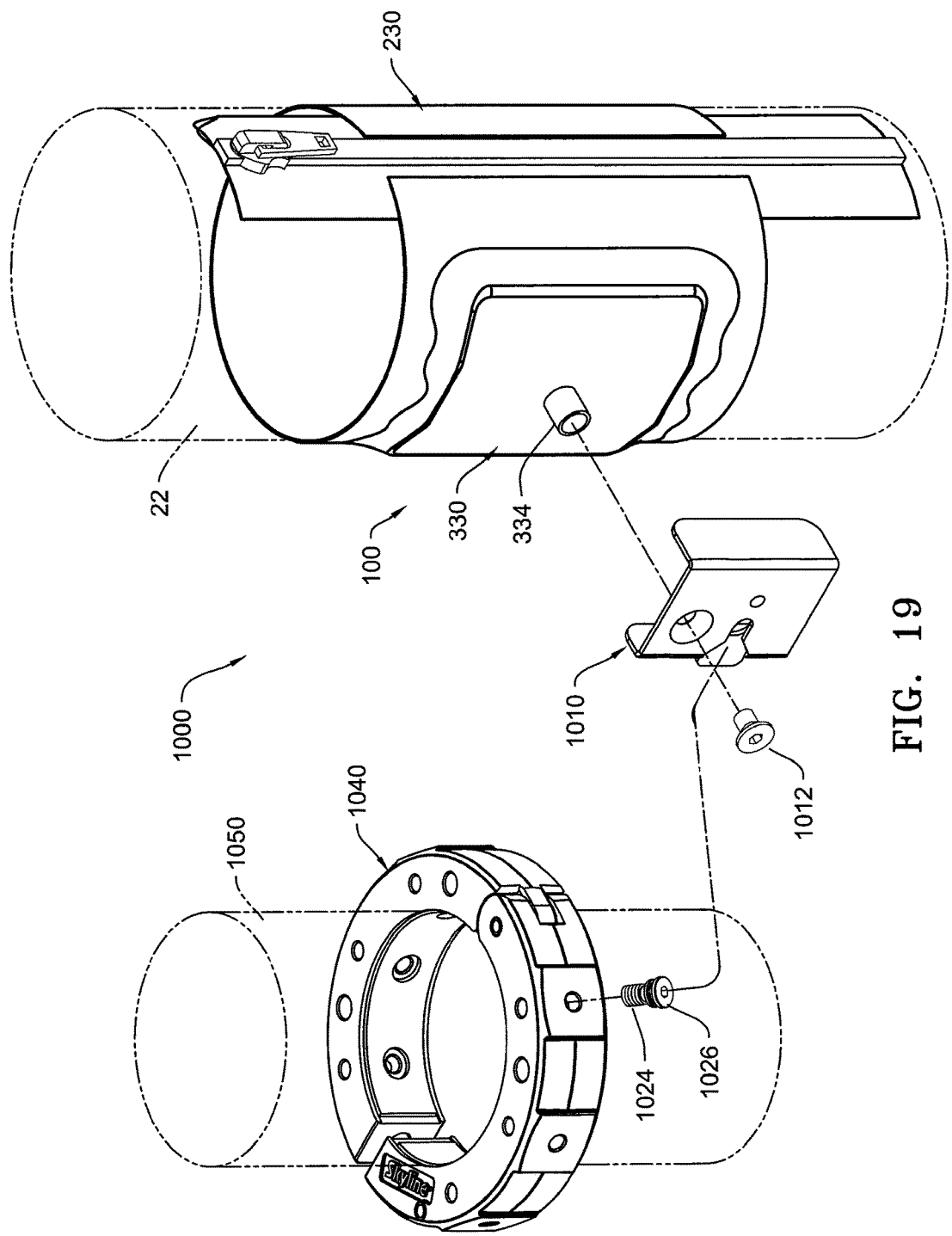
FIG. 19 is an exploded perspective view of another embodiment of a rigid member mounting system for attaching rigid cylindrical members.

FIGS. 17 and 19 are exploded perspective views of another accessory mounting system 100 for removably attaching posts, beams, or other non-inflatable members (hereinafter, collectively, rigid members) to the inflatable display 10 (hereinafter the rigid member mounting system 1000). This rigid member attaching system 1000 includes a stud cuff 230 mounted to an airframe member 22 of the first inflatable display 10. The rigid member mounting system 1000 further includes a mounting bracket 1010 which is threadably attached to one of the stud cuffs 230 by a threaded fastener 1012. As best viewed in FIG. 18, the mounting bracket 1010 includes a front plate 1014 with projecting flanges 1016, 1018 to offset the front plate from the stud mount 330. The front plate 1014 includes a flared notch 1020 intersecting an aperture 1022 having a diameter sized to receive a shaft of a pin 1024 but less than the diameter of the flanged head 1026 of the pin 1024. A spring plate 1030 extends into the flared notch 1020 and under the front plate 1014 and is secured thereto by a rivet 1032. The spring plate 1030 includes an aperture 1034 sized to receive the flanged head 1026 of the pin 1024 but is positioned on the spring plate so that a portion of the aperture 1034 is covered by the flared notch 1020 to that the opening is less than the diameter of the flanged head 1026 of the pin 1024. The other end of the pin 1024 is threadably attached to a rigid member connector 1040. As illustrated in FIG. 17, the rigid member connector 1040 may be a plate 1042 adapted to be received within a channel 1044 of a rigid member 1046. In another embodiment as illustrated in FIG. 19, the rigid member connector 1040 may be a ring 1048 adapted to attach to a cylindrical rigid member 1050.

Figure 20:
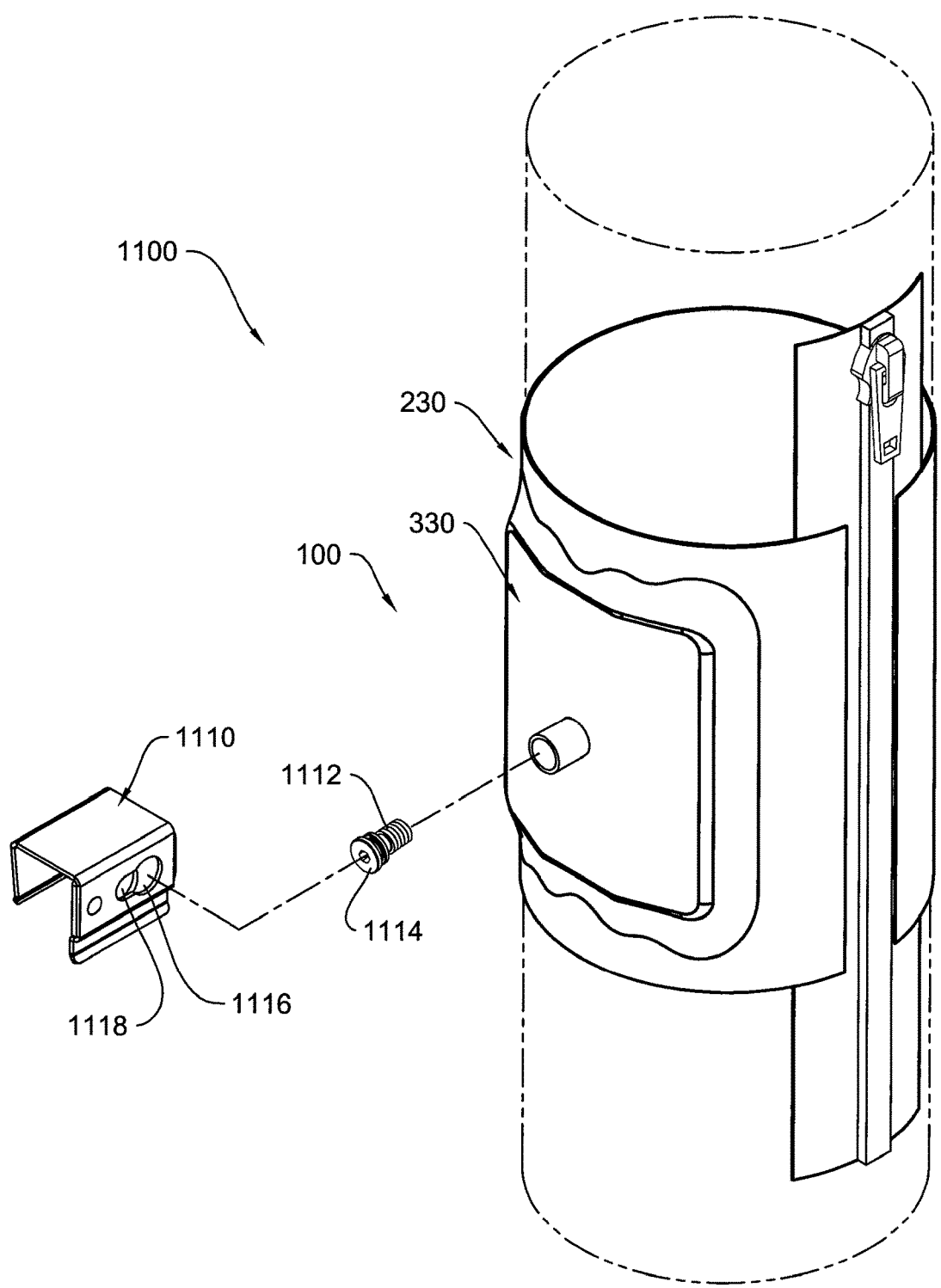
FIG. 20 is an exploded perspective view of another embodiment of a rigid member mounting system for attaching rigid rectangular tubular members.

FIG. 20 is an exploded perspective views of yet another accessory mounting system 100 for removably attaching other rigid members to the inflatable display 10 wherein the rigid member is not adapted to receive a threaded pin as in FIGS. 17 and 19. This rigid member attaching system 1100 includes a stud cuff 230 mounted to an airframe member 22 of the first inflatable display 10, a U-shaped mounting bracket 1110 and a threaded pin 1112 having a flanged head 1114. The threaded end of the pin 1112 is threadably received by the internally threaded stud 334 of the stud cuff 230. One leg of the U-shaped mounting bracket 1110 includes a large diameter aperture 1116 and an intersecting smaller diameter aperture 1118. The larger diameter aperture is sized to permit the flanged head 1114 to pass through. The smaller diameter aperture 1118 is sized to receive the shaft of the pin 1112 but is less than the diameter of the flanged head 1114. Thus, the mounting bracket 1110 is secured onto the pin 1112 by aligning the larger diameter aperture over the flanged head 1114 and moving the mounting bracket laterally with respect to the pin 1112 until the shaft is received in the smaller diameter aperture such that the mounting bracket 1110 is restrained from axial movement by the flanged head 1114.

Figure 22:
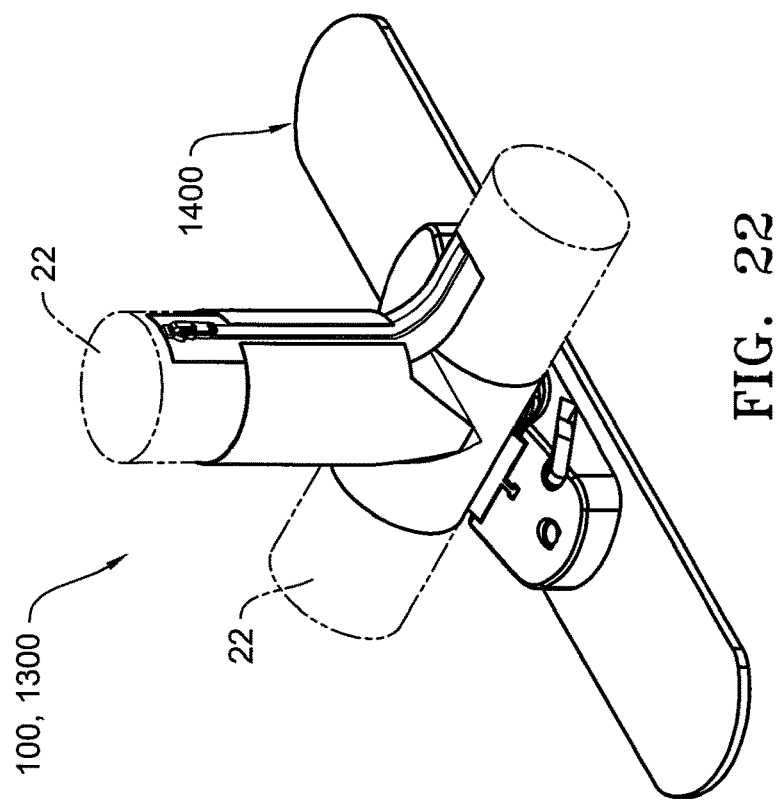
FIG. 22 is an enlarged perspective view of an embodiment of the foot mounting system identified by the circled area so designated in FIG. 2.
Figure 21:
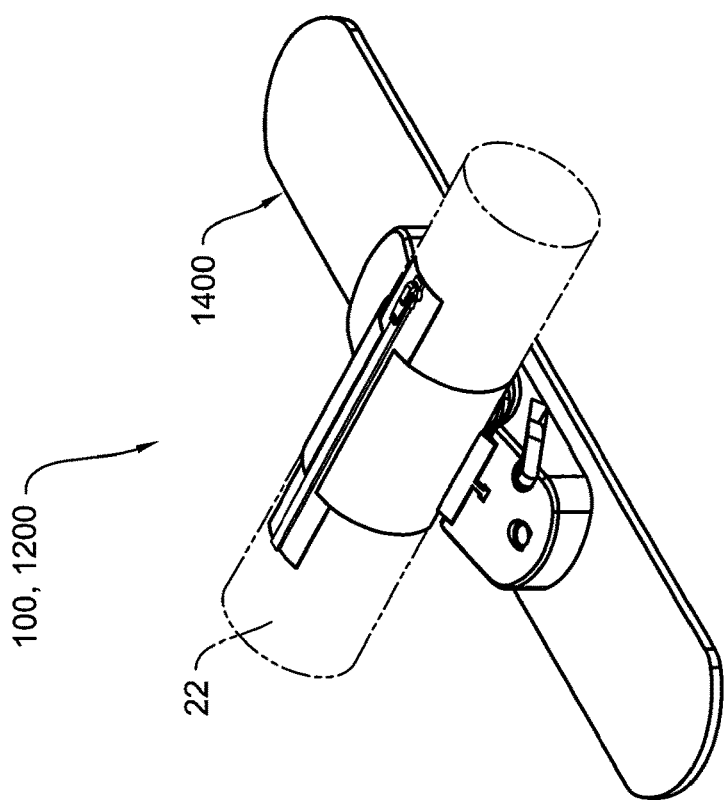
FIG. 21 is an enlarged perspective view of an embodiment of the foot mounting system identified by the circled area so designated in FIG. 2.

FIGS. 21 and 22 are enlarged exploded perspective views of the corresponding circled areas of FIG. 2 so designated, showing an accessory mounting system 100 for attaching support feet to the airframe 20 (hereinafter foot mounting systems 1200, 1300, respectively). Each of the foot mounting systems 1200, 1300 include a foot assembly 1400. Referring to FIGS. 23-24, the foot assembly 1400 includes an elongated bottom plate 1402 to which is attached a saddle block 1404. The saddle block 1404 removably receives a saddle plate 1406 (compare FIGS. 23A-23B). The saddle block 1404 includes a T-shaped groove 1408 which receives a mating T-shaped tongue 1410 on the bottom of the saddle plate 1406. The saddle plate 1406 is lockably positionable with respect to the saddle block 1404 by a brake assembly 1420. The brake assembly 1420 includes a brake lever 1422 which is pivotable between a locked position and an unlocked position as indicated by arrow 1424 of FIG. 23A. As best illustrated in FIGS. 24-25, the brake lever 1422 has a cammed lobe 1426 with an aperture 1428 which receives a pin 1430 pivotally retaining the brake lever 1422 within a brake lever slot 1432 in the side of the saddle block 1404. A brake shoe 1436 is disposed on one side of the groove 1408 of the saddle block 1404. Coil springs 1438 bias the brake shoe 1436 outwardly or away from tongue 1410 of the saddle plate 1406 received within the groove 1408. When the brake lever 1422 is pushed inwardly (as shown in FIG. 23B) the cammed lobe 1426 engages the side of the brake shoe 1436 forcing the brake shoe 1436 inwardly against the tongue 1410 of the saddle plate 1406 thereby frictionally locking the shoe plate 1406 in position within the groove. To release the saddle plate 1406 from the saddle block 1404, the brake lever is pivoted outwardly as shown by arrow 1424 in FIG. 23A. Because the lobe 1426 has a shorter radius on its back side 1440 than the cammed side, the inward force on the brake shoe 1436 is released and the bias of the coil springs 1438 pushes the brake shoe 1436 show away from the tongue 1410 allowing the saddle plate to slide within the groove 1408 permitting the saddle plate 1406 to be released from the saddle block 1404.

Figure 26:
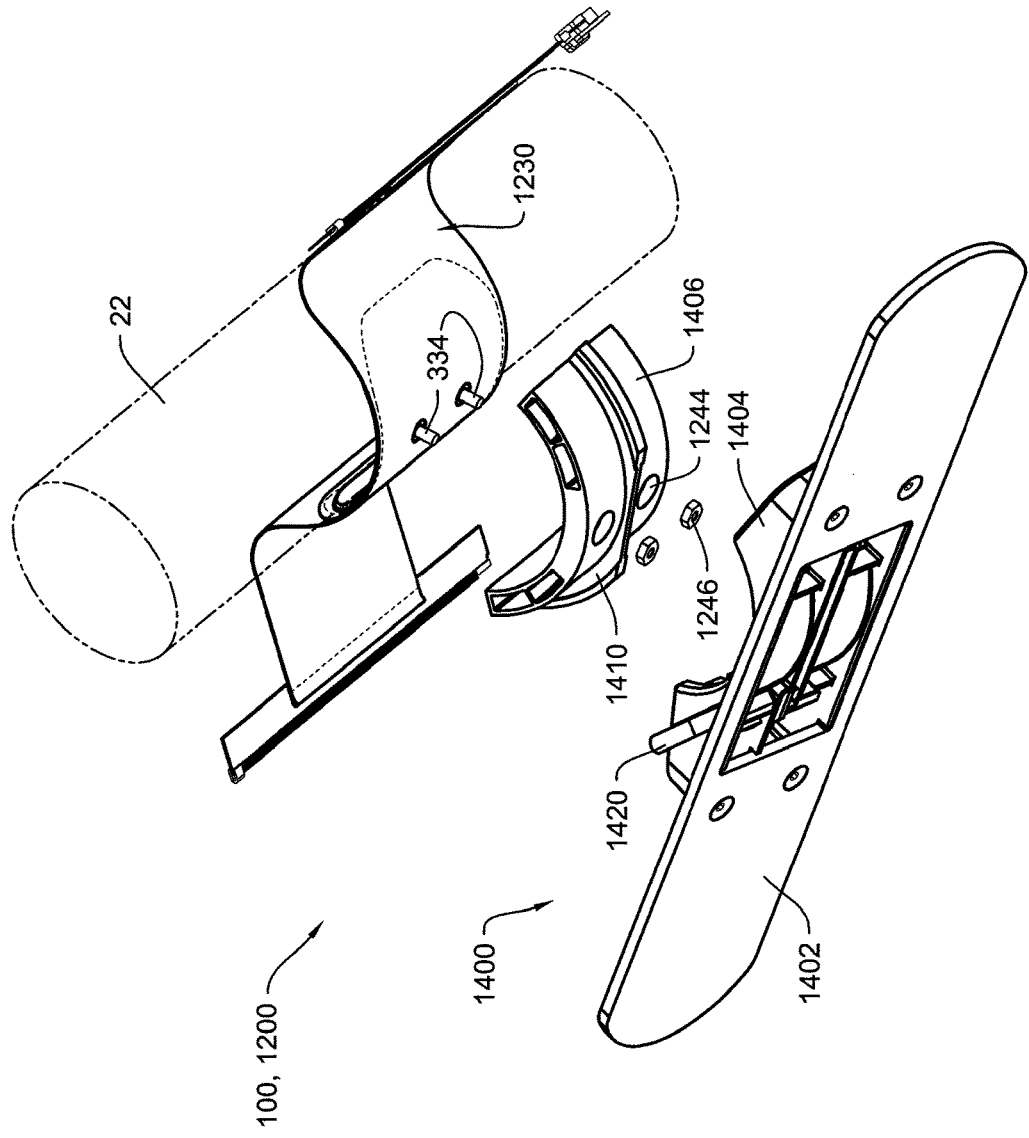
FIG. 26 is an exploded bottom perspective view of the foot mounting system of FIG. 21.
Figure 27:
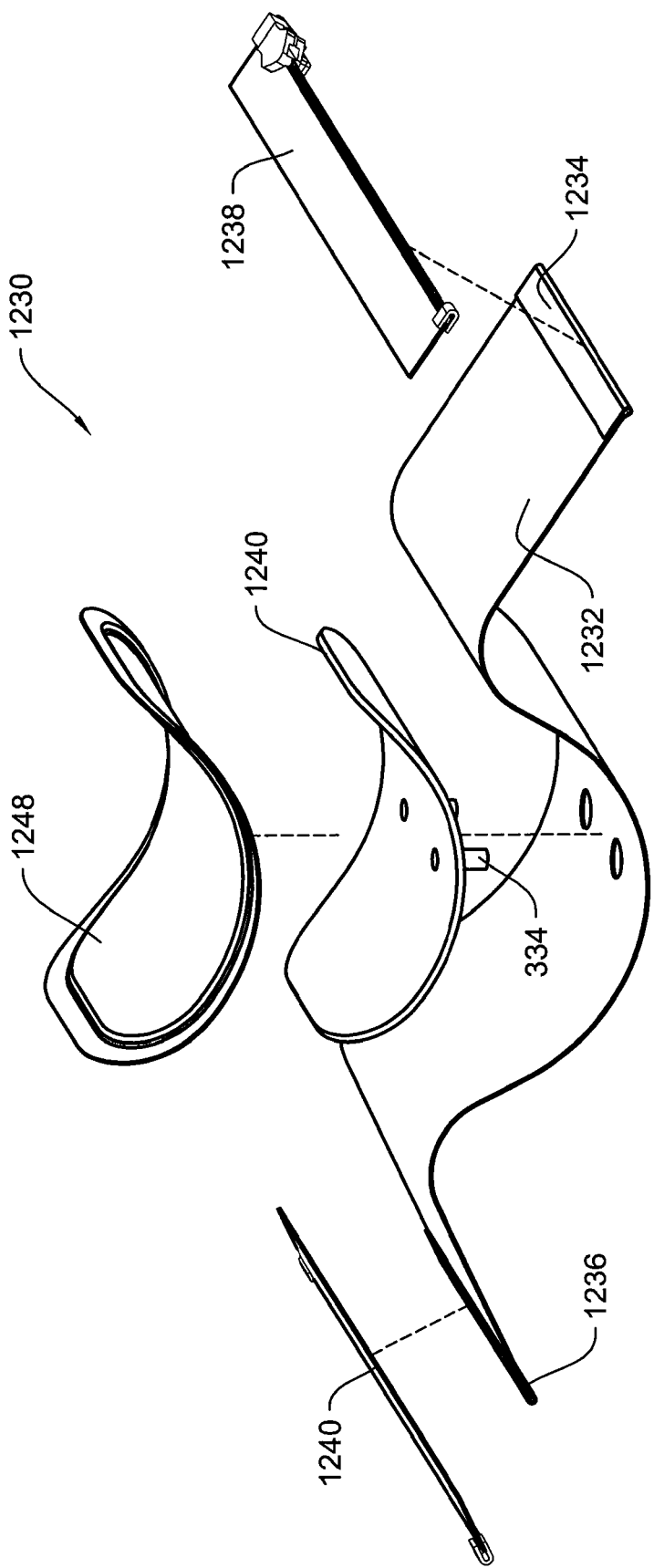
FIG. 27 is an exploded perspective view of the straight foot cuff of FIG. 21.

As shown in FIGS. 26-27, the foot mounting system 1200 includes a stud cuff similar to the stud cuff 230 of the embodiments of the accessory mounting systems 700, 800, 900, 1000, and 1100. In this embodiment, the cuff 1230 comprises a cuff body 1232 having first and second ends 1234, 1236 which are removable attach to one another, such as by a zipper, or by any other suitable attachment means, including, without limitation, hook-and-loop fasteners, snaps, lacing, clasps, etc. As shown in FIG. 27, mating sides of a zipper 1238, 1240 are stitched to the respective first and second ends of the cuff body 1232. The cuff body 1232 may be made of the same material as the sleeve 24 of the airframe members 22. The cuff body 1232 is sized so that when the ends 1234, 1236 are attached, the cuff frictionally engages the airframe member 22 when the display is fully inflated so that the cuff 1230 does not slide with respect to the airframe member 22. The cuff 1230 may also be secured to the sleeve 24 of the airframe member such as by a plastic pop rivet, stitching or other suitable attaching means to retain the cuff in the desired position with respect to the airframe member 22 so that the cuff 1230 does not move when the display is deflated, thereby avoiding the need to reposition the cuff 1230 each time display is used.

The cuff 1230 includes a stud mount 330 comprising a rigid cuff plate 1240 with two internally threaded studs 334 secured thereto. The rigid cuff plate 1240 may be made of any suitably rigid material, that is also preferably light weight. The studs 334 extend through apertures 1242 in the cuff body 1232 and through bores 1244 in the saddle plate 1406 and are secured to the saddle plate 1406 by nuts 1246 recessed within the bores 1244 on the back side of the saddle plate 1406. A patch 1248 may be provided on the back side of the cuff plate 1240 to protect the sleeve 24 from abrasion and wear. The patch 1248 may be made of any suitable, and preferably non-abrasive material, and may be adhered by an adhesive or by stitching (as designated by dashed lines) to retain the cuff plate 1240 in position.

Figure 28:
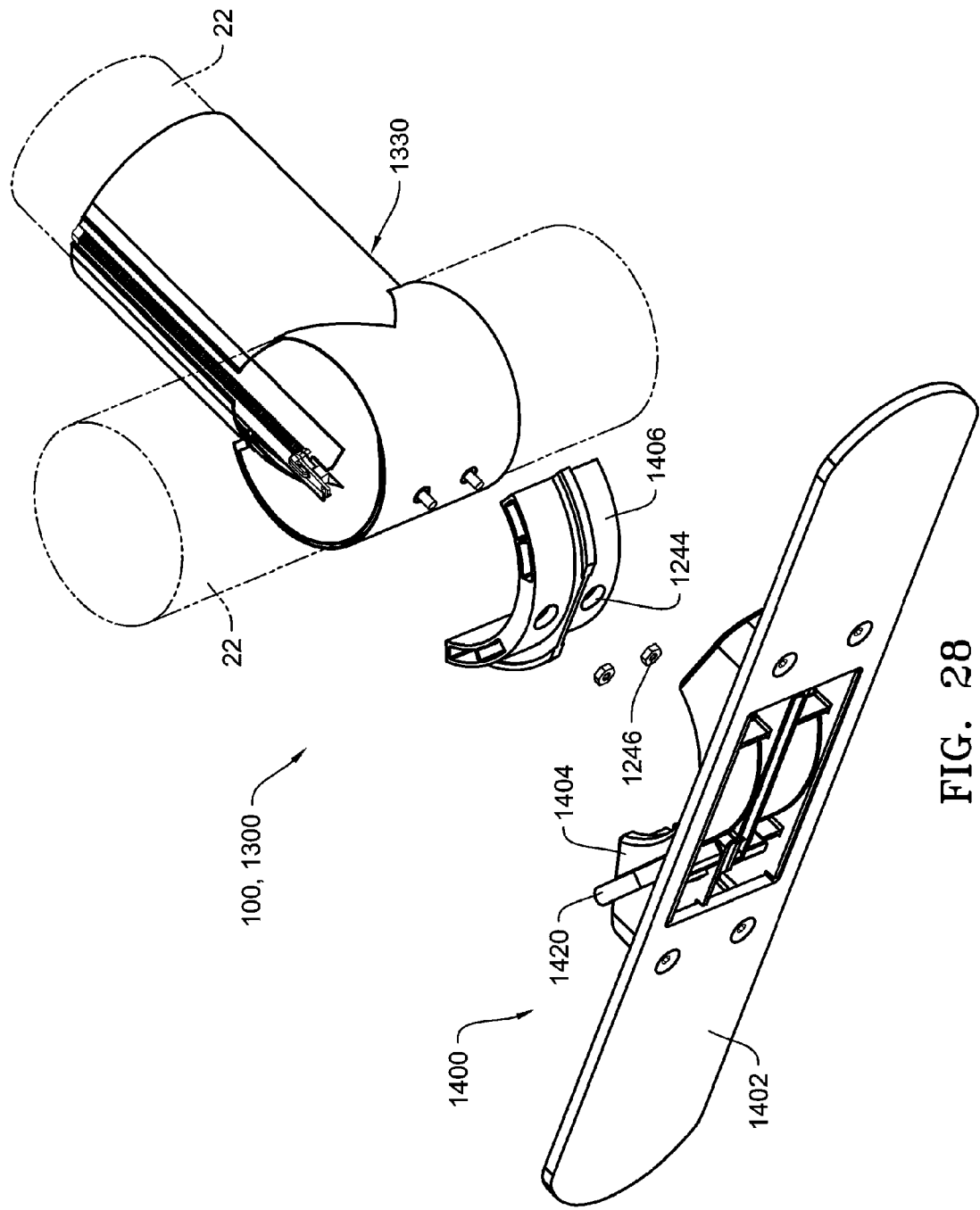
FIG. 28 is an exploded perspective view of the foot mounting system of FIG. 22.
Figure 29:
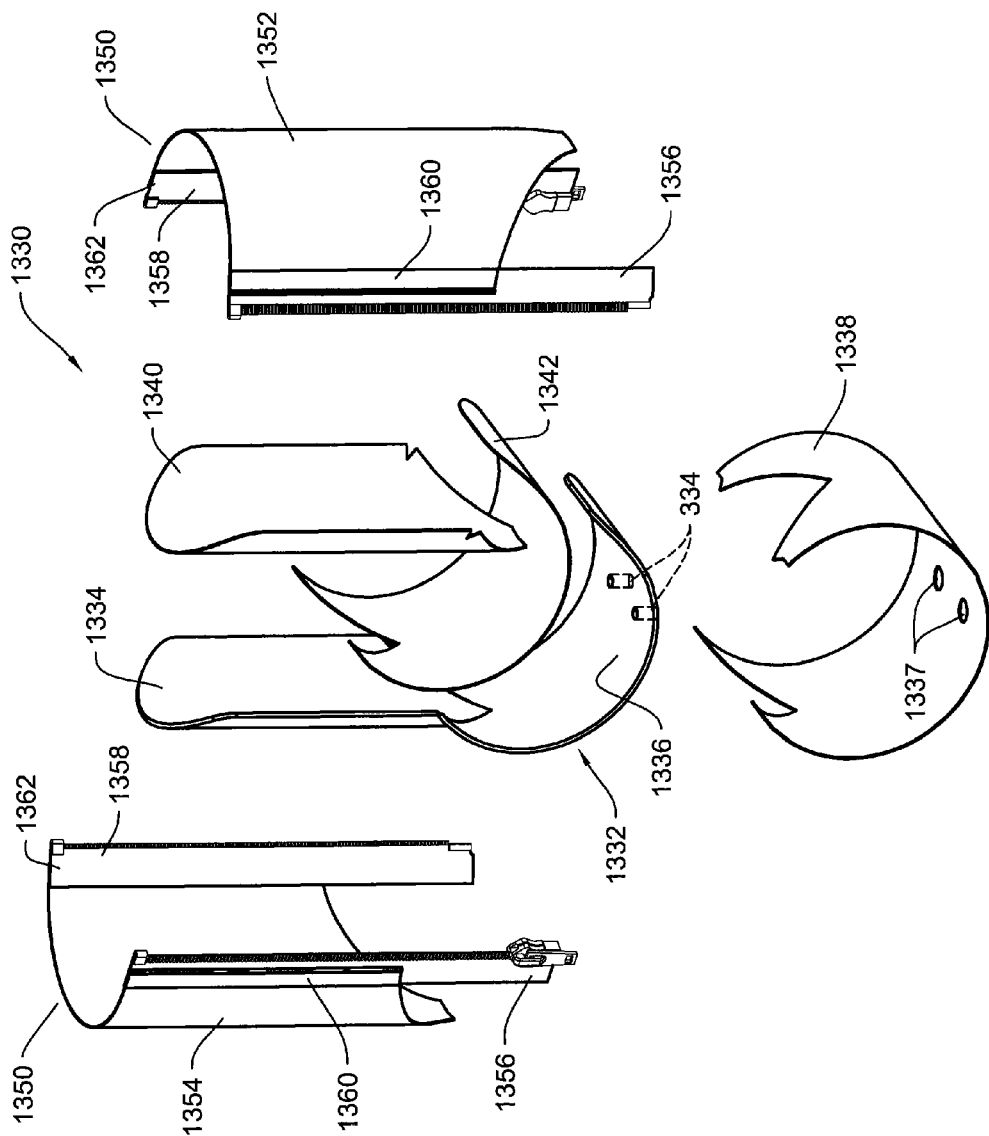
FIG. 29 is an exploded perspective view of the T-shaped foot cuff of FIG. 22.

An alternative embodiment of the foot mounting system 1300 is shown in FIGS. 28-29. As in the previously described foot mounting system, a cuff is provided. However in this embodiment, the cuff is configured as a T-shaped cuff 1330 to attach to the airframe 20 at an intersection of the horizontal and vertical airframe members. The cuff 1330 includes a stud mount 330 comprising a rigid cuff plate 1332 with two internally threaded studs 334. The rigid cuff plate may be made of steel, aluminum or other suitably rigid material. The rigid cuff plate includes an upper extension 1334 sized and shaped to receive a portion of a vertical airframe member 22 and an arcuate lower 1336 portion sized and shaped to receive a portion of a horizontal airframe member 22. The arcuate lower portion 1336 includes apertures 1337 for receiving the studs 334 of the stud mount 330. An outer liner 1338 and inner liners 1340, 1342 line the rigid cuff plate 1332 to minimize wear or abrasion of the sleeves 24 of airframe members 22. The liners 1338, 1340, 1342 be made of vinyl material or other suitable material. The cuff 1330 includes mating halves 1352, 1354 forming the cuff body 1350 which are removably attached to one another, such as by a zipper, or by any other suitable attachment means, including, without limitation, hook-and-loop fasteners, snaps, lacing, clasps, etc. As shown in FIGS. 28-29, mating sides of two zippers 1356, 1358 are stitched to the respective ends 1360, 1362 of the mating halves 1352, 1354 of the cuff body 1350. The cuff body 1350 may be made of the same material as the sleeve 24 of the airframe members 22. The cuff body 1350 is sized so that when the mating halves 1352, 1354 are attached, the cuff frictionally engages the airframe member 22 when the display is fully inflated so that the cuff 1330 does not slide with respect to the airframe member 22. The cuff 1330 may also be secured to the sleeve 24 of the airframe member such as by a plastic pop rivet, stitching or other suitable attaching means to retain the cuff in the desired position with respect to the airframe member 22 so that the cuff 1330 does not move when the display is deflated, thereby avoiding the need to reposition the cuff 1330 each time display is used. The mounting mechanism 300 of the cuff 1330 and the manner of attachment to the saddle plate 1406 is substantially the same as the mounting mechanism of the cuff 1230.

The foregoing description is presented to enable one of ordinary skill in the art to make and use the invention, and is provided in the context of a patent application and its requirements. Various modifications to the embodiments and the general principles and features described herein will be readily apparent to those of skill in the art. Thus, the present invention is not to be limited to the embodiments described above and illustrated in the drawing figures, but is to be accorded the widest scope consistent with the spirit of this disclosure and the appended claims.

The invention claimed is:

1. In combination, an accessory mounting system and an inflatable display, the inflatable display having an inflatable airframe and an exterior cover providing a display surface, the inflatable airframe comprising inflatable airframe members covered by the display surface, the accessory mounting system comprising:
   a cuff selectively positionable onto a select one of the inflatable airframe members, the cuff configured and sized to substantially surround and frictionally engage the selected airframe member when the inflatable display is in an inflated state, said cuff further remaining on the selected airframe member when the inflatable display is in a deflated state, the cuff further having a mounting mechanism; and an accessory connector removably attachable onto the mounting mechanism over the exterior cover, the accessory connector adapted to support an accessory.

2. The combination of claim 1 wherein the cuff is removably fixably attached to the selected airframe member such that said cuff remains in the selected position when the inflatable display is in the deflated state.

3. The combination of claim 1 wherein the mounting mechanism is a magnetic mount.

4. The combination of claim 3 wherein the magnetic mount comprises a cuff plate having at least one magnet.

5. The combination of claim 4 wherein the cuff plate is non-magnetic.

6. The combination of claim 4 wherein the accessory connector includes a magnet having an opposite pole of the magnet of the cuff plate.

7. The combination of claim 6 wherein the accessory connector includes a male setoff.

8. The combination of claim 6 wherein the accessory connector includes a female setoff.

9. The combination of claim 6 wherein the accessory connector includes a male setoff received by a female setoff attached to the accessory.

10. The combination of claim 1 wherein the mounting mechanism is a stud mount having a threaded stud.

11. The combination of claim 10 wherein the stud mount comprises a cuff plate having at least one internally threaded stud.

12. The combination of claim 11 wherein the threaded stud projects through the display surface of the exterior cover.

13. The combination of claim 11 wherein the accessory connector attaches to the stud mount by a threaded fastener.

14. The combination of claim 13 wherein the accessory connector remains attached to the stud mount when the inflatable display is in a deflated state.

15. The combination of claim 14 wherein the accessory connector is a lamp bracket.

16. The combination of claim 14 wherein the accessory connector is a mounting bracket adapted to connect to a rigid member.

17. The combination of claim 14 wherein the accessory connector includes a spring biased clip adapted to receive one end of a connector stud attached to an accessory.

18. The combination of claim 14 wherein the accessory connector includes a saddle plate.

19. The combination of claim 18 wherein the saddle plate is received by a saddle of a foot assembly, the foot assembly having an elongated bottom plate.

20. The combination of claim 19 wherein the foot assembly includes a brake for lockably positioning the saddle plate with respect to the saddle.

21. The combination of claim 19 wherein the cuff is a T-shaped cuff selectively positionable onto an intersection of a horizontal airframe member and a vertical airframe member of the inflatable airframe.

22. The combination of claim 19 wherein the cuff is a straight cuff selectively positionable onto a horizontal airframe member of the inflatable airframe.

23. The combination of claim 13 wherein the accessory connector is a male setoff.

24. The combination of claim 23 wherein the male setoff is received by a female setoff attached to an accessory.

25. The combination of claim 23 wherein the male setoff threadably attaches to a ball joint.

26. The combination of claim 25 wherein the ball joint supports an audio-visual accessory.

27. The combination of claim 13 wherein the accessory connector is a female setoff.

28. The combination of claim 1 wherein the accessory is a foot assembly.

29. The combination of claim 1 wherein the accessory is a lamp.

30. The combination of claim 1 wherein the accessory is an audio-visual (AV) component.

31. The combination of claim 1 wherein the accessory is an overlay.

32. The combination of claim 31 wherein the overlay is inflatable overlay member and wherein the inflatable overlay member includes:
a cuff selectively positionable onto the inflatable overlay member, the cuff sized to frictionally engage the inflatable overlay member when the inflatable overlay member is in an inflated state, said cuff remaining on the inflatable overlay member when in a deflated state, the cuff further having a mounting mechanism;
a second connector removably attachable onto the mounting mechanism of the inflatable overlay member, the second connector adapted to connect to the accessory connector of the inflatable display.

33. The combination of claim 1 wherein the accessory is a second inflatable display, the second inflatable display having an inflatable airframe and an exterior cover providing a display surface, the second inflatable airframe comprising inflatable airframe members covered by the display surface, and wherein the second inflatable display includes:
a cuff selectively positionable onto a select one of the inflatable airframe members of the second inflatable display, the cuff sized to frictionally engage the selected airframe member when the second inflatable display is in an inflated state, said cuff remaining on the selected airframe member when the second inflatable display is in a deflated state, the cuff further having a mounting mechanism;
a second connector removably attachable onto the mounting mechanism over the exterior cover of the second inflatable display, the second connector adapted to connect to the accessory connector of the first inflatable display.

34. The combination of claim 1 wherein the accessory is a rigid member.

35. The combination of claim 1 wherein the cuff includes first and second connecting ends and has a predetermined length.

36. The combination of claim 35 wherein the first and second connecting ends comprise portions of a zipper.

37. The combination of claim 35 wherein the connecting ends comprise hook and loop fasteners.

* * * * *